United States Patent
Sobhani et al.

(10) Patent No.: US 11,595,267 B2
(45) Date of Patent: Feb. 28, 2023

(54) METHODS AND SYSTEMS FOR DISTRIBUTED NETWORK VERIFICATION

(71) Applicants: Ashkan Sobhani, Kanata (CA); Xingjun Chu, Ottawa (CA)

(72) Inventors: Ashkan Sobhani, Kanata (CA); Xingjun Chu, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/131,102

(22) Filed: Dec. 22, 2020

(65) Prior Publication Data

US 2022/0200868 A1    Jun. 23, 2022

(51) Int. Cl.
*H04L 41/14*        (2022.01)

(52) U.S. Cl.
CPC .................. *H04L 41/145* (2013.01)

(58) Field of Classification Search
CPC ..................................... H04L 41/145
See application file for complete search history.

(56) References Cited

U.S. PATENT DOCUMENTS

| | | | |
|---|---|---|---|
| 2004/0233859 A1* | 11/2004 | Martin | H04L 41/00 370/254 |
| 2011/0078104 A1 | 3/2011 | Honkola et al. | |
| 2014/0351677 A1 | 11/2014 | Xiang | |
| 2018/0367416 A1* | 12/2018 | Nagarajan | H04L 41/0866 |
| 2019/0245830 A1* | 8/2019 | Ratnasingham | H04L 41/0893 |

FOREIGN PATENT DOCUMENTS

| | | |
|---|---|---|
| CN | 101789034 A | 7/2010 |
| CN | 110521169 A | 11/2019 |

OTHER PUBLICATIONS

Wikipedia, "Binary Decision Diagram," 2015. (Year: 2015).*
Kazemian et al., "Header Space Analysis: Static Checking for Networks," 2012. (Year: 2012).*
Kazemian et al., "Header Space Analysis," Jun. 2013. (Year: 2013).*
Sanger et al., "Identifying Equivalent SDN Forwarding Behavior," Apr. 3, 2019. (Year: 2019).*

(Continued)

*Primary Examiner* — Andrew C Georgandellis

(57) ABSTRACT

Methods and systems for partially or fully distributed network verification are described. In partially distributed network verification, each network device generates a respective device-level binary decision diagram (BDD) representing the logical behavior of the respective network device for a network property of interest. The device-level BDDs from each network device are received by a verification service that performs verification by generating an input BDD representing an input header space, and applies each device-level BDD in a logical path from a source device to a destination device, and reports the output BDD. In fully distributed network verification, each network device is responsible for calculating a device-specific output BDD by applying a device-specific BDD, which represents the logical behavior of the network device, to a device-specific input BDD.

18 Claims, 11 Drawing Sheets

(56) References Cited

OTHER PUBLICATIONS

Li, Y. et al., "A Survey on Network Verification and Testing With Formal Methods: Approaches and Challenges", IEEE Communications and Surveys & Tutorials, vol. 21, No. 1, pp. 940-969, 2019.
Steffen, S. et al., "Probabilistic Verification of Network Configurations", SIGCOMM '20, Aug. 10-14, 2020, Virtual Event, NY, USA, pp. 750-764, 2020.
J. James et al, A framework for verification and validation of integrated and adaptive control systems, Proceedings of the 2000 IEEE International Symposium on Computer-Aided Control System Design Anchorage, Alaska, USA, Sep. 25-27, 2000, total 6 pages.

* cited by examiner

METHODS AND SYSTEMS FOR DISTRIBUTED NETWORK VERIFICATION

RELATED APPLICATIONS

This is the first patent application for the present disclosure.

FIELD

The present disclosure is related to methods and systems for network verification, including methods and systems for network verification using a fully or partially distributed verification service.

BACKGROUND

As networks and the operations of network devices have been become more complicated, it has become increasingly difficult for network operators to ensure that network configurations and policies are designed and installed in accordance with the desired intentions. Moreover, considering the size of many existing networks, using traditional network testing tools (e.g., simple network management protocol (SNMP), or tracing tools such as tracer or ping) provides limited coverage of the network. Further, such network tracing techniques are used to reactively diagnose problematic issues after these issues have occurred.

To address some of the aforementioned complications and limitations, formal verification techniques which have been previously used in software and chip design have been considered for use in verification of a network. The term "formal" refers to the use of mathematical models and calculations to verify network configuration, in place of tracking a network by sending actual data packets. Formal network verification may be referred to simply as network verification, in the context of the present disclosure. Network verification provide proactive and predictive identification of problematic issues. However, practical application of network verification still faces challenges in terms of scalability and real-time verification.

Typically, in network verification, the network to be verified (checked, tested, or validated) is modeled using mathematical techniques, and then the desired invariants of the network are checked in the model to specify the correct (actual or more accurate) behavior of the network. Validation may occur continuously, or at periodic intervals, or from time to time, for example. Examples of existing network verification techniques can be classified into four categories including model checking, theorem proving, Boolean satisfiability (SAT)/satisfiability modulo theory (SMT) solver, symbolic execution and symbolic simulation. Most existing network verification approaches rely on a centralized computing system that performs the necessary tasks of data collection and verification calculations. Such a centralized approach may make it difficult to scale up for larger networks, due to limits in computing power and memory resources, as well as the challenges presented by real-time data collection from a large number of network devices.

Thus, there is a need for improved techniques for network verification.

SUMMARY

In various examples, the present disclosure describes methods and systems for network verification that help to address some of the drawbacks of existing network verification techniques that rely on a centralized computing system to perform the verification.

In the disclosed methods and systems, a fully or partially distributed approach is used for network verification. Instead of a centralized system collecting data from all network devices, each network device is instead responsible for generating its own device model, which is a logical representation (e.g., as a Boolean decision diagram) of its own logical behavior. Such a distributed approach avoids the need for data collection from all network devices, which can cause time delay that negatively impacts real-time network verification. Further, the security of the network may be improved because detailed information about the configuration of network devices do not need to be communicated. The generation of device models may be performed by individual network devices in parallel rather than by a centralized system. Individual device models may also be updated locally by the network device, when configuration of the network device changes, without having to engage with a central entity. Thus, the disclosed distributed approach to network verification can help to reduce the time required for model generation, thus enabling more efficient use of time and computing resources for network verification.

The disclosed distributed approach to network verification may enable verification of a portion (also referred to as a slice) of the network, or verification of a specific function of the network, without having to verify the entire network. This is possible because each network device generates and stores its own verification model locally, rather than a single centralized model being generated and stored at a central entity for the entire network. This provides the technical effect that verification for a portion of the network can be performed using fewer resources, rather than having to verify the entire network.

The disclosed distributed approach may also avoid the problem of state explosion (and hence enable better scalability), compared to conventional centralized approaches to network verification. Further advantages and technical effects are described in the detailed description.

In some example aspects, the present disclosure describes a method for verification of a network. The method includes: obtaining, from each network device in the network, a respective device-level binary decision diagram (BDD) representing logical behavior of the respective network device for a network property of interest; generating an input BDD as input to a source BDD representing a source device in a logical topology representing connections among the network devices, the input BDD being defined to represent an input header space to query for the network property of interest; calculating an output BDD representing an output header space outputted by a destination device in the logical topology, wherein the output BDD is calculated by sequentially applying, to the input BDD, each device-level BDD in a logical path from the source device to the destination device; reporting the output BDD; and comparing the reported output BDD to an expected output BDD, to verify the network property of interest.

In any of the above examples, the method may include: transmitting, to each network device, a request for the respective device-level BDDs; and obtaining the respective device-level BDDs in respective responses from the respective network devices.

In any of the above examples, the method may include: defining the logical topology in accordance with the network property of interest, the logical topology being defined using a topology graph, the device-level BDDs being respective vertices in the topological graph.

In any of the above examples, the method may include: obtaining at least one device-level BDD from a transmission from a respective network device, the transmission being received in absence of a request for the device-level BDD.

In any of the above examples, the method may include: identifying at least one border device in the network devices, the border device providing an interface between the network and one or more entities outside of the network; and obtaining, from the at least one border device, information about the one or more entities outside of the network.

In any of the above examples, the information about the one or more entities outside of the network may be used to generate the input BDD.

In some example aspects, the present disclosure describes a method for generating a model for network verification. The method includes: collecting data about states and configurations of network entities in a network device; modeling each network entity as a respective Boolean function and encoding the respective Boolean function as a respective binary decision diagram (BDD); logically combining the respective BDDs to obtain a device-level BDD that is a model representing logical behavior of the network device; and transmitting the device-level BDD to a verification service.

In any of the above examples, the device-level BDD may be generated in response to a request received from the verification service.

In any of the above examples, the method may include: obtaining information for a non-committed configuration of at least one network entity. The respective BDD encoded for the at least one network entity may represent the non-committed configuration.

In any of the above examples, the method may include: receiving, from the verification service, confirmation to implement the non-committed configuration; and in response to the confirmation, cause the non-committed configuration to be a committed configuration implemented by the at least one network entity.

In some example aspects, the present disclosure describes a method for verification of a network. The method includes: obtaining, at a network device, a device-specific input binary decision diagram (BDD) representing a device-specific input header space to query for a network property of interest; calculating a device-specific output BDD representing a device-specific output header space, wherein the device-specific output BDD is calculated by applying a device-specific BDD to the device-specific input BDD, the device-level BDD representing logical behavior of the network device; storing the device-specific input BDD and the device-specific output BDD; and comparing the device-specific output BDD and the device-specific input BDD, to verify the network property of interest at the network device.

In any of the above examples, the method may include: transmitting the device-specific output BDD to one or more neighboring devices having a direct physical or logical connection with the network device.

In any of the above examples, the method may include: identifying the one or more neighboring device and establishing a peer-to-peer connection with each of the one or more neighboring devices.

In any of the above examples, the network device may be a border device that provides an interface between the network and one or more entities outside of the network, and obtaining the device-specific input BDD may include: receiving the device-specific input BDD that is generated using collected configuration information about the one or more entities outside of the network.

In any of the above examples, obtaining the device-specific input BDD may include receiving the device-specific input BDD from a neighboring device that has a direct physical or logical connection with the network device.

In any of the above examples, the method may include: collecting data about states and configurations of network entities in the network device; modeling each network entity as a respective Boolean function and encoding the respective Boolean function as a respective BDD; logically combining the respective BDDs to obtain a device-level BDD that is a model representing logical behavior of the network device; and storing the device-level BDD.

In any of the above examples, the method may include: synchronizing a verification clock with one or more neighboring devices, the verification clock defining a synchronized timing for data collection.

In some example aspects, the present disclosure describes a computing system including a processor device and a memory storing instructions. The instructions, when executed by the processor device, cause the computing system to perform any of the example methods described above.

In some example aspects, the present disclosure describes a computer-readable medium having instructions stored thereon. The instructions, when executed by a processor device of a computing system, cause the computing system to perform any of the example methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
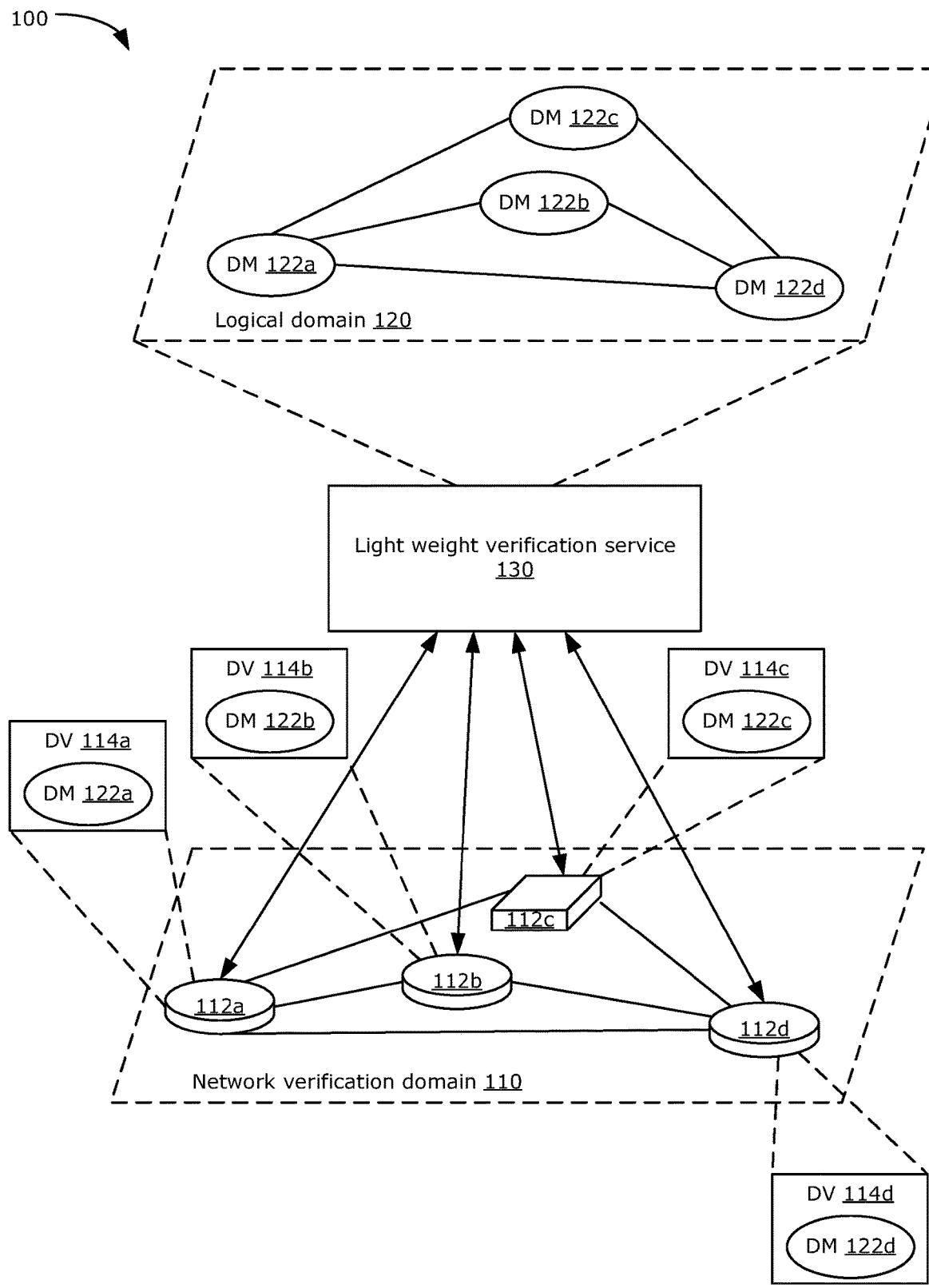
FIG. 1 illustrates an example verification architecture that may be used to implement a partially distributed network verification, in accordance with some examples of the present disclosure.

As used herein, the term "computer network" refers to a set of computing devices or electronic communication devices in communication with one another using one or more standardized digital communication protocols. The communications may take place over any type of wired or wireless digital communication link, or combinations thereof. The devices may be routers, switches, computers such as servers or personal computers, mobile devices such as smartphones, Internet of Things (IoT) devices, or any other devices capable of transmitting, receiving, and/or routing communications via a digital communication network. Whereas some examples are described herein with reference to computer networks, it will be appreciated that the methods, systems, and media described herein may be applicable to systems other than computer networks that may use Boolean functions or binary decision diagrams (BDDs) to represent systems states. (In general, one thing represents another when the thing representing symbolizes, includes relevant information from, signifies, or otherwise stands for the thing being represented.)

As used herein, the term "network entity" (NE) refers to a data structure or set of rules applied by a device in a computer network to determine how a communication in the network is treated, on the basis of the values of various data fields (also called simply "fields") present in the communication. A NE may therefore be represented as a table that may be used to determine whether the values of the fields of a communication (such as a digital data packet) satisfy various criteria, and to thereby determine how the communication is to be treated (e.g., forwarded to a specific device or port, translated, accepted, or rejected). NEs may include access control lists (ACL), MAC address tables, IP address tables, NAT tables, and so on. It will be appreciated that any set of rules used by switches, routers, or other network devices to determine treatment of a data packet, and therefore may affect how a network treats a given communication, may potentially be represented as a NE.

As used herein, a "field" refers to a data field. A communication (such as a data packet) may specify values for one or more fields, and NEs may specify one or more values or ranges of values for the field as part of a rule determining treatment of the communication. Examples of common fields used in computer networks include IP address, MAC address, and port number.

To assist in understanding the present disclosure, some known verification tools and their drawbacks are first discussed.

One network verification tool is the open source network analysis tool Batfish. This tool simulates the control-plane to obtain the forwarding rules (FIB) (As indicated by context, to obtain is to acquire, and the acquisition need not be by any particular means or from any particular source). The results is that this tool tends to be very slow to execute, for example requiring hours for verification of a relatively small network. Another existing network verification tool is Minesweeper. Because this tool is designed based on satisfiability module theory (SMT), it cannot provide more than one counterexample when a violation occurs. Another existing network verification tool is Veriflow, which is an enhanced version of another tool known as Anteater. Veriflow extracts equivalent classes for the whole network, however performing such a task can be difficult or impossible for a network composed of different segments controlled in different administration domains. Moreover, computing equivalent classes may be challenging or resource-intensive for large-scale networks. NetPlumber is another existing verification tool, which takes an approach similar to Veriflow. NetPlumber verifies only the parts of the network which are impacted by a change in network rules, and does not verify the entire network.

Another existing network verification tool is referred to as Hassel-C (or HSA). This tool encodes pack headers as subsets of geometric space. The drawback of this approach is that HSA suffers from state space explosion in the case of a large number of required bits of header space. Network Optimized Datalog (NOD) is another existing verification tool that is similar to HSA, but using a different encoding technique. NOD has been reported to have slow performance.

Some conventional network verification tools use a model checking approach. In model checking, a single large model is built for the entire network, for example even the location of packets is represented in a finite state machine (FSM) embedded in a single network model. The conventional model checking approach has the benefit of being faster to calculate, because there is only one model to consider for the entire network. However, a drawback is a lack of details about the location or cause of a detected fault in the network. An example of the model checking approach is Flow-Checker. FlowChecker uses model checking to verify the correctness of Open Flow networks. However, FlowChecker has been found to suffer from scalability problems and may be limited to practical application in relatively small networks.

Some conventional solutions for network verification attempt to solve the problem of scalability. For example, Libra attempts to address the problem of inconsistent network snapshots (i.e., captured information about the network at a single time point) and hence attempt to improve scalability. Using Libra, network event streams are monitored so that configuration information of network devices (e.g., forwarding tables) are captured when the network is stable. However, such an approach still relies on a centralized entity.

Some conventional network verification tools use a symbolic execution or symbolic simulation approach. HSA, for example, is based on symbolic execution. In symbolic execution, all possible executions of a system are determined by inputting different possible values of a symbolic variable into the system and evaluating the resulting output from the system. Symbolic simulation uses a similar technique, but applied to a simulated model of the system rather than the real-world system. The symbolic simulation approach provides any desired level of detail for simulating the network execution, however there is a problem of state space explosion when the network is large and/or the network is modeled to a high level of detail.

The present disclosure describes methods and systems that enables network verification to be performed in a partially or fully distributed manner. Such a distributed approach helps to address at least some of the drawbacks of centralized verification approaches, such as state explosion, limited scalability, or possible security threats. The present disclosure describes both partially distributed network verification and fully distributed network verification. It should be understood that both approaches are considered distributed network verification approaches, and both partially and fully distributed network verification can provide advantages over conventional network verification solutions.

In the disclosed methods and systems, verification models represent individual NEs. In the verification process as disclosed herein, the header space is considered as a symbolic variable (based on the approach used in symbolic simulation), and this variable passed through a path in the network. The network can be modeled without losing any verification context, and without having to build a large model which can lead to the state explosion problem. The disclosed methods and systems may thus increase scalability for verifying large networks.

FIG. 1 shows a simple example of a partially distributed verification architecture 100 that may be used to implement examples described herein. The disclosed verification architecture 100 includes a Network Verification Domain (NVD) 110, a Light Weight Verification Service (LWVS) 130, and Distributed Verifiers (DVs) 114.

The NVD 110 refers to the actual network to be verified, and contains all the network devices that are to be verified as part of the network. In this example, the NVD includes four network devices 112a, 112b, 112c, 112d (generally referred to as network device 112). Each network device 112 within the NVD 110 may be any device that participate in communication of packets in a network. For example, each network device 112 may independently be one of: a router, a switch, a gateway, or any other network-enabled device, among other possibilities. Typically, the behavior of a network is modeled on the basis of network devices 112 used for managing network traffic, such as routers, switches, servers, firewalls, and so on. Although FIG. 1 shows a single NVD 110, it should be understood that multiple NVDs 110 may be defined for verification of the whole network, or portion(s) of the network. Different NVDs 110 may be defined to include different network devices 112, different NVDs 110 may be defined to have different logical topologies (e.g., different logical connections among the same set of network devices 112, or different arrangements or inter-relationships among the logical components) and different NVDs 110 may overlap (i.e., have one or more network devices 112 in common and/or have one or more logical connections in common). For example, on NVD 110 may be defined for a specific routing protocol (e.g., border gateway protocol (BGP)), for a specific network layer (e.g., layer 2 topology), and other such possibilities. Different NVDs 110 may thus be defined to enable verification of the entire network or a portion of the network, and may be specific to a particular network property or network mechanism of interest.

Each network device 112a, 112b, 112c, 112d implements a respective distributed verifier (DV) 114a, 114b, 114c, 114d (generally referred to as DV 114) to perform the operations disclosed herein. The DV 114 may be implemented using software instructions, hardware components, or a combination of software and hardware. The network device 112 performs operations for computing a local verification model (referred to as a device model (DM)) and for participating in the verification task. In this example, each network device 112a, 112b, 112c, 112d computes a respective DM 122a, 122b, 122c, 122c (generally referred to as DM 122). The network device 112 communicates the respective computed DM 114 to the LWVS 130. The network device 112 may also store its respective computed DM 122 (also referred to as the local DM 122) in local memory (i.e., in the memory of the respective network device 112). In some instances, a network device 112 may not have capability to execute its own DV 114 (e.g., the network device 112 has limited processing power and/or limited memory resources). If a given network device 112 does not have capability to execute its own DV 114, the given network device 112 may provide information (e.g., information about its state and configuration) to the LWVS 130 and the LWVS 130 may compute the DM 122 for the given network device 112. Alternatively, the given network device 112 may provide information (e.g., information about its state and configuration) to a neighboring network device 112 (which does have capability to compute DMs 122) to compute the DM 122 on behalf of the given network device 112. The computed DM 122 (whether computed by the LWVS 130 or the neighboring network device 112) may be communicated back to the given network device 112 to be stored locally by the given network device 112.

In some instances, a network device 112 (such as network devices 112a, 112c, 112d) may be a border network device (or simply a border device). A border device is a network device 112 that interfaces with other entities outside of the NVD 110. Generally, any entity outside of the NVD 110 may be referred to as the outside environment of the NVD 110, and is not verified by the verification of the NVD 110. A border device may perform operations that are not required by other network devices 112 that are not border devices (e.g., the network device 112b is not a border device). For example, a border device may collect and communicate information about the configuration of interfaces connecting to the outside environment of the NVD 110 and/or information about logical routes received from other entities in the outside environment. It should be noted that whether a given network device 112 is a border device or not is dependent on the NVD 110. A network device 112 that is a border device for one NVD 110 may not be a border device for a second NVD 110. It should be understood that references to network devices 112 in the present disclosure are intended to encompass both border devices and non-border devices, whereas references to border devices are intended to be specific to border devices and not necessarily applicable to non-border devices.

Each network device 112 is modeled by a respective corresponding DM 122. The DM 122 is computed using state and configuration information of the local network device 112. The DM 122 that models a given network device 112 is designed to represent the functional behavior of the network device 112 according to verification requirements. For instance, for data-plane verification, the DM 122 represents the behavior of the corresponding network device 112 in the data-plane. On the other hand, for control mechanism verification, the DM 122 represents the behavior of the corresponding network device 112 in terms of running routing protocols and route-policies. There may be multiple DMs 112 generated for modeling the behavior of a single given network device 112 (e.g., one DM 112 for modeling data-plane behavior, and a second DM 112 for modeling control-plane behavior). Each DM 122 is represented as a Boolean function, which is encoded as a BDD, for example as a reduced ordered BDD (ROBDD). It should be understood that references to a BDD in the present disclosure may more specifically be a reference to a ROBDD.

A BDD is a data structure that is used to represent a Boolean function. A BDD can be represented as a binary decision tree consisting of a top node, below which are one or more binary decision sub-trees that recursively follow the same pattern. A BDD can be used to model decisions made by a corresponding network device 112 (i.e., the network device 112 being modeled by the DM 122 that is in turn represented by the Boolean function that is encoded as the BDD) with regard to specific communications made via the network in the NVD 110. For example, a digital data packet sent in the NVD 110 may include one or more fields (e.g., an internet protocol (IP) address, a port number, and a media access control (MAC) address) that is used by a network device 112 to decide how that packet should be treated (e.g., forwarded to a specific other device, refused, granted access). The network device 112 may make this decision using one or more NEs (e.g., access control lists (ACL), MAC address tables, network address translation (NAT) tables, forwarding information base (FIB), routing policy, protocol configurations, etc.) hosted on the network device 112. Each NE may be represented by a Boolean function that can be modeled using a respective BDD. As will be described further below, the network device 112 may be modeled based on the BDDs of the NEs hosted on the network device 112.

A ROBDD is a reduced form of BDD, in which any isomorphic subgraphs have been merged, and any nodes having two isomorphic child nodes are removed. A ROBDD is a unique representation of a Boolean function. Often, common usage of the term BDD is intended to refer to ROBDD specifically.

The LWVS 130 performs operations for defining the NVD 110, managing the network devices 112 (e.g., including assigning specific network devices 112 to act as border devices) and collecting information (e.g., DMs 122 and information about the outside environment) from the network devices 112. The LWVS 130 uses the collected information to perform the network verification. The LWVS 130 may transmit a request (e.g., via broadcast, group cast, or multicast to multiple network devices 112, or via unicast to individual network device(s) 112) for the information, and the network devices 112 may respond to the request with the respective DMs 122 and (in the case of BDVs) information about the outside environment. In some examples, the LWVS 130 may receive information from a network device 112 without having transmitted a request for the information. For example, a network device 112 may unilaterally transmit unsolicited information (e.g., an updated DM 122) to the LWVS 130 when there is a change in the state or configuration of the respective network device 112. Further details about the operation of the LWVS 130 will be discussed further below.

The LWVS 130 may define a logical topology in the logical domain 120 among the DMs 122. The logical topology may be defined based on the network property(ies) of interest. It should be noted that the logical topology in the logical domain 120 does not necessarily match the physical topology among network devices 112 in the NVD 110. For example, if a property of interest is reachability on an overlay network on top of the physical network, the logical topology may be defined by the LWVS 130 based on the connections (or tunnels) among network devices 112 on the overlay network.

Figure 2A:
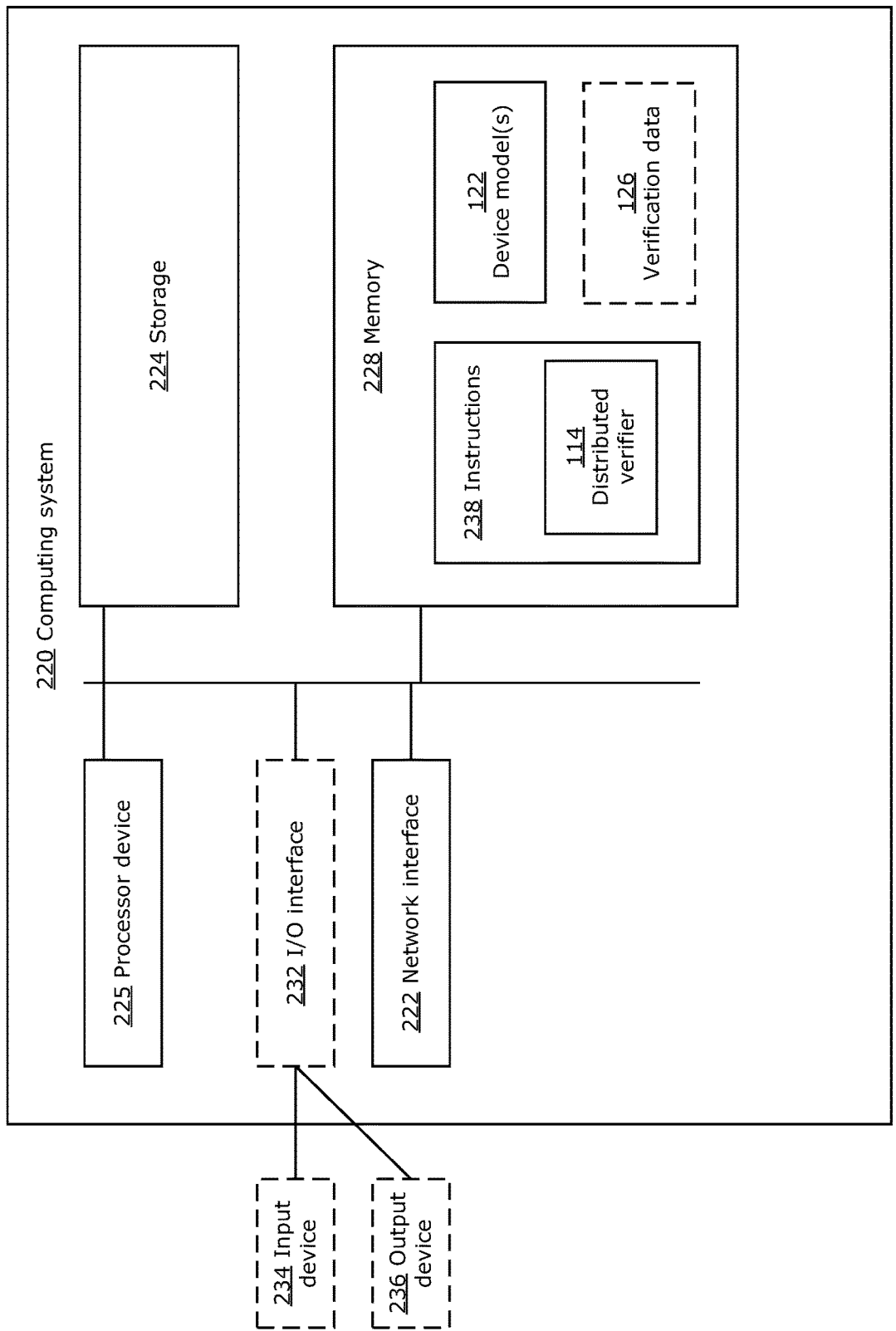
FIGS. 2A and 2B are block diagrams illustrating simplified examples of computing systems, which may be used to implement examples of the present disclosure.

FIG. 2A is a block diagram illustrating a simplified example of a computing system 220, suitable for carrying out examples described herein. For example, a network device 112 may be implemented using the computing system 220. Other examples suitable for implementing embodiments described in the present disclosure may be used, which may include components different from those discussed below. Although FIG. 2A shows a single instance of each component, there may be multiple instances of each component in the computing system 220.

The computing system 220 may include one or more processor devices 225, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The computing system 220 may also include one or more optional input/output (I/O) interfaces 232, which may enable interfacing with one or more optional input devices 234 and/or optional output devices 236.

In the example shown, the input device(s) 234 (e.g., a keyboard, a mouse, a microphone, a touchscreen, and/or a keypad) and output device(s) 236 (e.g., a display, a speaker and/or a printer) are shown as optional and external to the system 220. In other examples, there may not be any input device(s) 234 and output device(s) 236, in which case the I/O interface(s) 232 may not be needed.

The computing system 220 may include one or more network interfaces 222 for wired or wireless communication with one or more devices or systems of a network, such as other network devices 112 in the NVD 110 and the LWVS 130. The network interface(s) 222 may include wired links (e.g., Ethernet cable) and/or wireless links (e.g., one or more antennas) for intra-network and/or inter-network communications.

The computing system 220 may also include one or more storage units 224, which may include a mass storage unit such as a solid state drive, a hard disk drive, a magnetic disk drive and/or an optical disk drive.

The computing system 220 may include one or more memories 228, which may include a volatile or non-volatile memory (e.g., a flash memory, a random access memory (RAM), and/or a read-only memory (ROM)). The non-transitory memory(ies) 228 may store instructions 238 for execution by the processor device(s) 225, such as to carry out examples described in the present disclosure. In some examples, the memory(ies) 228 may include software instructions 238 for execution by the processor device 225 to implement aspects of the distributed network verification disclosed herein. The software instructions 238 may also include other instructions, such as for implementing an operating system and other applications/functions. In this example, the DV 114 is implemented using software instructions 238 stored in the memory(ies) 228.

The non-transitory memory(ies) 228 may also store data, including DM(s) 122 that have been generated by the network device 112. In some examples (e.g., in fully distributed network verification examples), the memory(ies) 228 may also store local verification data 126.

In some examples, the computing system 220 may additionally or alternatively execute instructions from an external memory (e.g., an external drive in wired or wireless communication with the computing system 220) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Figure 2B:
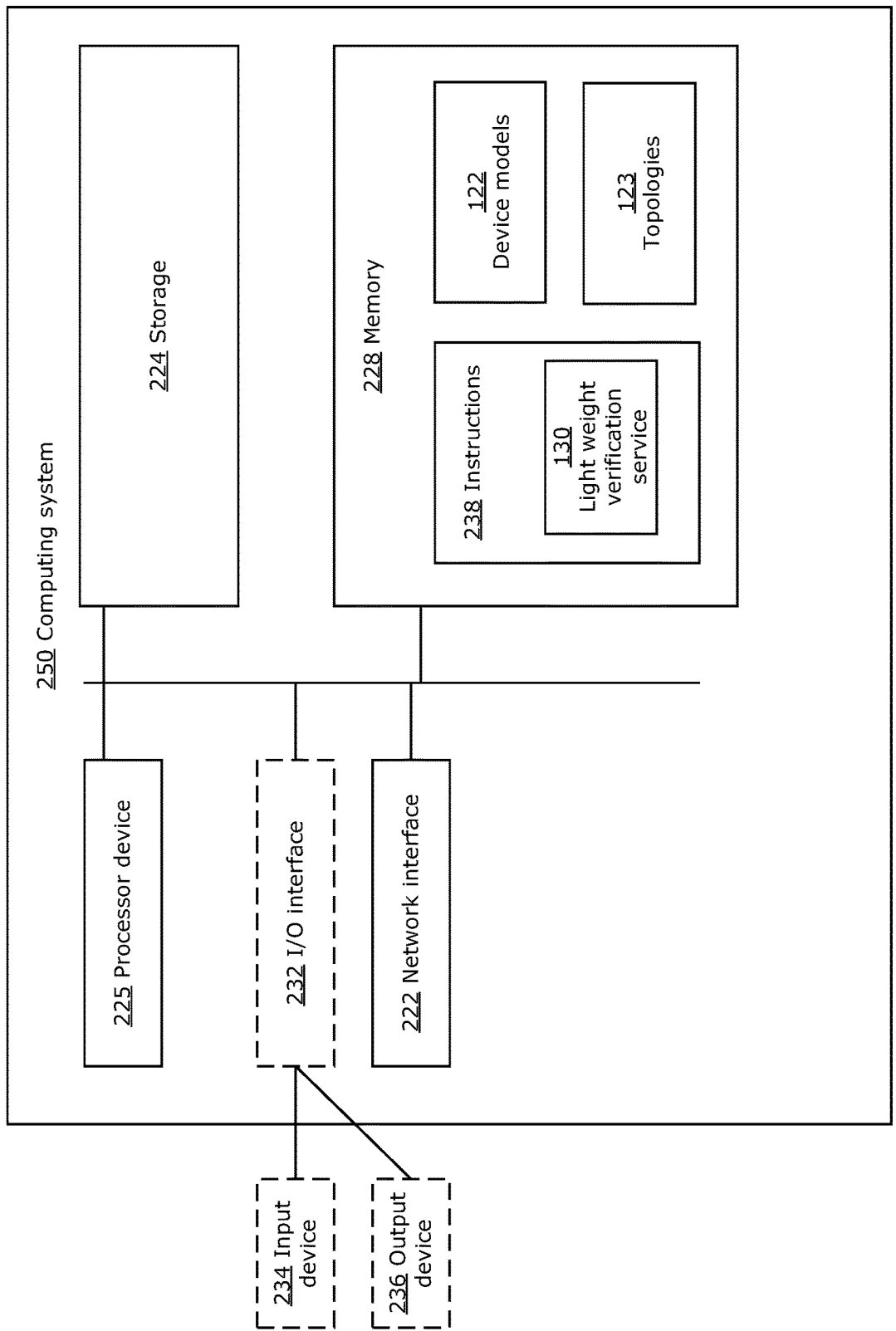

FIG. 2B is a block diagram illustrating a simplified example of another computing system 250, suitable for carrying out examples described herein. The computing system 250 may be a server, a computer or a cloud computing platform, among other possibilities. For example, the LWVS 130 may be implemented using the computing system 250. Other examples suitable for implementing embodiments described in the present disclosure may be used, which may include components different from those discussed below. Although FIG. 2B shows a single instance of each component, there may be multiple instances of each component in the computing system 250. The computing system 250 may include components similar to the computing system 220 of FIG. 2A, and the details of similar components need not be repeated.

The computing system 250 may include one or more processor devices 225, one or more optional input/output (I/O) interfaces 232 (for interfacing with one or more optional input devices 234 and/or optional output devices 236), one or more network interfaces 222 (for wired or wireless communication network devices 112), one or more storage units 224, and one or more memories 228.

The non-transitory memory(ies) 228 may store instructions 238 for execution by the processor device(s) 225, such as to carry out examples described in the present disclosure. In this example, the LWVS 130 is implemented using software instructions 238 stored in the memory(ies) 228. The non-transitory memory(ies) 228 may also store data, including DMs 122 that have been received from DVs 114, and topologies 123 defining the NVD 110 and defining the logical domain 120. In some examples, some or all of the DMs 122 and/or topologies 123 may be stored in an external memory (e.g., an external database, or on cloud-based storage) accessible by the computing system 250.

In some examples, the computing system 250 may additionally or alternatively execute instructions from an external memory (e.g., an external drive in wired or wireless communication with the computing system 250) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

It will be appreciated that various components and operations described herein can be implemented using other computing systems, and other computing architectures.

Figure 3:
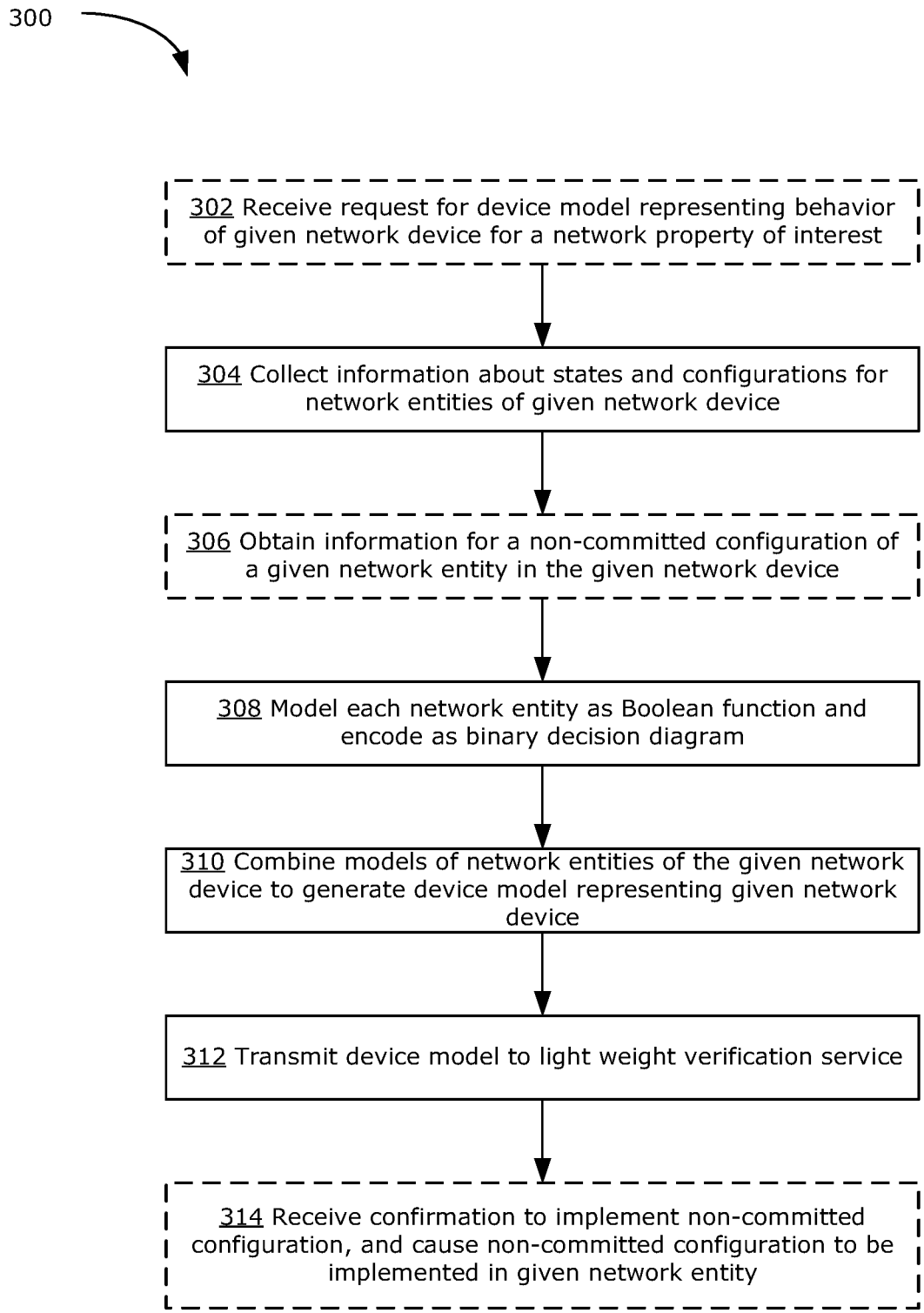
FIG. 3 is a flowchart illustrating an example method for building a device model at a network device, in accordance with examples described herein.

FIG. 3 is a flowchart illustrating an example method 300 that may be performed by a given network device 112 implementing a DV 114 (e.g., implemented by the computing system 220, using the processor device 225 executing instructions 238). For example, steps of the method 300 may be encoded as operations to be performed by the DV 114 residing on the given network device 112. The method 300 may be performed to compute the local DM 122 representing the given network device 112. The method 300 may be performed by the network device 112 at the start of network verification (e.g., triggered by a request for the DM 122 received from the LWVS 130), and may also be performed subsequently when there is any change to the state or configuration of the network device 112.

Optionally, at 302, the network device 112 receives a request, from the LWVS 130, for a DM 122 representing the behavior of the given network device 112 for a network property of interest. The request from the LWVS 130 may also identify the network property of interest (e.g., reachability in layer 2 or layer 3 of the data plane, or reachability in the control plane). Alternatively, instead of receiving a request from the LWVS 130, the network device 112 may determine that there has been a change to the state or configuration of the network device 112 and the DM 122 may require updating.

At 304, the network device 112 collects information about the states and configurations of the NEs of the network device 112. The network device 112 may first determine the NEs (e.g., ingress/egress ACL, FIB, routing policy, protocol configuration, etc.) of the network device 112 that are relevant to the network property of interest, and collect state and configuration information from the relevant NEs.

Optionally, at 306, the network device 112 may obtain information for a non-committed configuration of an NE. The network device 112 may store different versions of configuration information for an NE. Each version of the configuration information for a given NE may represent a committed configuration (which is the configuration currently implemented by the NE) or a non-committed configuration (which is a configuration that is not currently implemented, but which may be implemented at a future time). Information about a committed configuration may be obtained by the network device 112 from the current configuration of the NE. Information about a non-committed configuration may be obtained from the LWVS 130, or may be obtained from a local memory of the network device 112.

Subsequent steps of the method 300 may be performed using information about a committed or non-committed configuration. That is, the DM 122 that is computed using the following steps may represent a configuration that is in current use, or may represent a possible configuration that is not currently being used. Building a DM 122 that represents a possible configuration that is not currently being used may enable a possible configuration to be verified, prior to actual implementation in the network device 112. This may enable a more proactive verification process.

At 308, the network device 112 models each NE as a respective Boolean function and encodes the Boolean function into a BDD. For example, each NE may be modeled as a transfer function or FSM (e.g., depending on whether the model represents data-plane or control-plane behavior) using the collected information. The transfer function or FSM is represented as a Boolean function, which is then encoded into a BDD format. For example, if the network property of interest is reachability, all NEs in the logical path between two ports of the network device 112 may be modeled as respective transfer functions and encoded into BDD format.

At 310, the models of all relevant NEs of the given network device 112 are combined, based on the logical interactions of the NEs, to generate a single DM 122 representing the function of the given network device 122, for the network property of interest. For example, if the property of interest is reachability, the models of all NEs in the logical path from an ingress port of the network device 112 to an egress port can be combined using a logical AND operation, to generate a single port-to-port model representing the reachability between two ports of the network device 122. Then a DM 122 for the network device 122 can be generated by joining all port-to-port models by a logical OR operation. In this way, a single DM 122 may be computed for each network device 112, to enable verification of a reachability property. Other models may be similarly generated to represent the behavior of each network device 112 with respect to other network properties of interest. The computed DM 122 thus represents the logical behavior of the given network device 112 in the NVD 110, and the logical behavior of all NEs within the given network device 112, for the network property of interest.

At 312, the computed DM 122 is transmitted to the LWVS 130. The computed DM 122 may also be stored locally at the network device 122. The LWVS 130 may then use the DM 122 to perform verification on the network property of interest.

Optionally, at 314, if the DM 122 was generated using information about a non-committed configuration for a given NE in the network device 112, the network device 112 may receive, from the LWVS 130, confirmation to implement the non-committed configuration. For example, after the LWVS 130 has verified the correctness of the non-committed configuration using the DM 122, the LWVS 130 may instruct the network device 112 to commit to the verification configuration (i.e., so that the non-committed configuration that has been verified using the DM 122 becomes the committed configuration for the given NE). The network device 112 implement the verified non-committed configuration as the new configuration for the given NE. The previously committed configuration becomes a non-committed configuration, and may be stored locally for future use.

Figure 4:
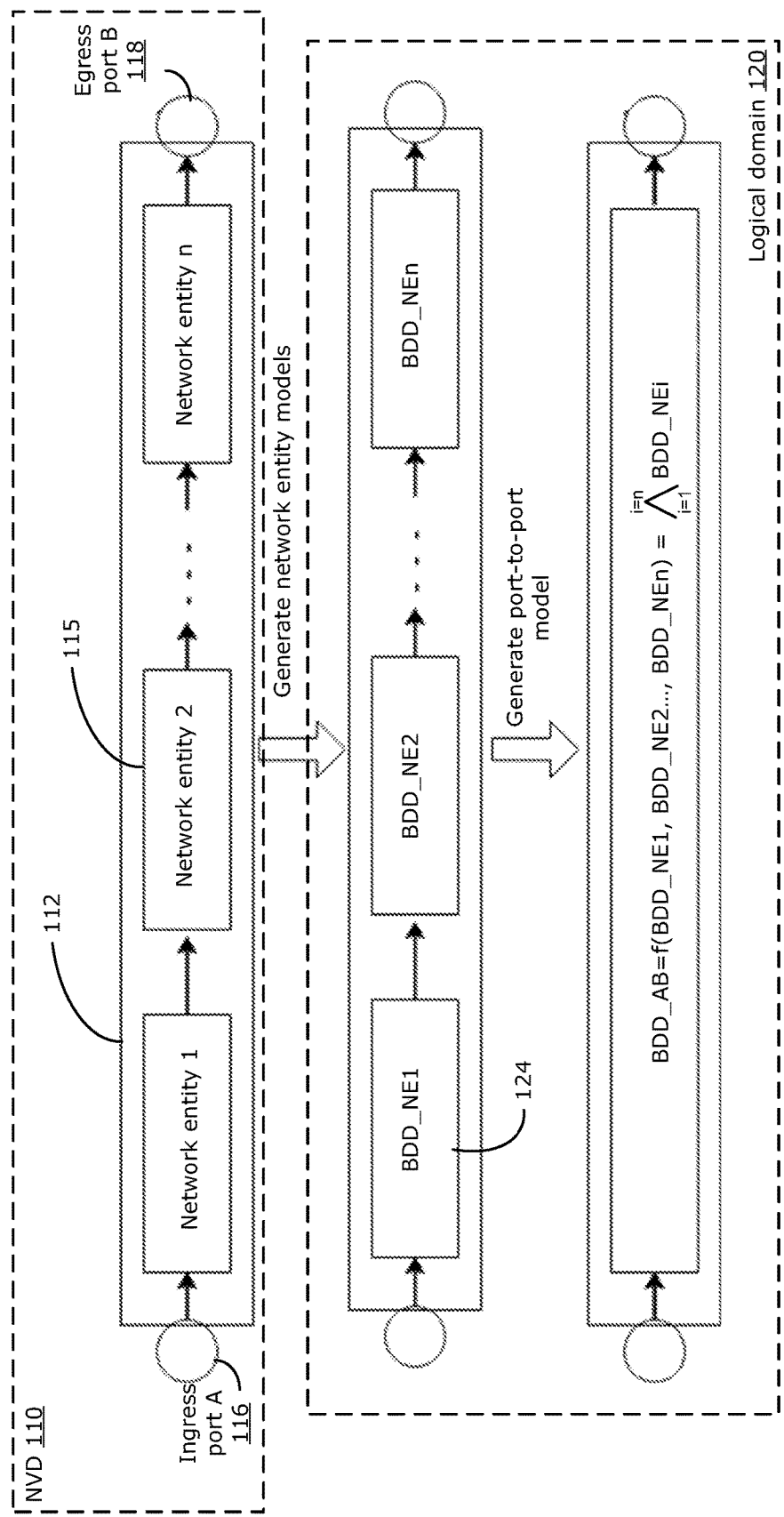
FIG. 4 illustrates an example implementation of the method of FIG. 3.

FIG. 4 shows an example implementation of some steps of the method 300, in a simplified network device 112. FIG. 4 illustrates an example of how a port-to-port model is generated by a given network device 112 using the DV 114, for verification of a reachability property of the network.

In this example, the network device 112 includes a number, n, of NEs 115 (indicated as network entity 1, network entity 2, to network entity n) in the logical path from ingress port A 116 to egress port B 118. Each NE 115 may independently be any NE as discussed herein. In particular, with respect to the reachability property, each NE 115 may independently be a set of rules or a table (e.g., a routing table) used in the network device 112 to manage routing of a packet based on information contained in the packet header. Information about the configuration and state of each NE 115 are collected at steps 304-306 described above. From this information, at step 308 each NE 115 is modeled as a Boolean function and encoded as respective BDDs 124 in the logical domain 120. For example, for data plane verification, each NE 115 may be modeled as a Boolean function that applies a forwarding rule based on the binary bits representing an address (e.g., IP or MAC address) of the packet source and/or destination, in the packet header. Each NE 115 may transition the packet from one state to another, or change the position of the packet in the logical path.

In the example shown, respective NE-level BDDs 124 (indicated as BDD_NE1, BDD_NE2, to BDD_NEn) are generated for each respective NE 115, and stored by the DV 114. Each NE-level BDD 124 is a function that may be encountered by a packet along the logical path from an ingress port to an egress port. The port-to-port model between ports A and B, which is in the form of a port-to-port BDD representing the Boolean function governing routing of a packet from ingress port A 116 to egress port B 118, is then generated by combining all NE-level BDDs 124 using logical AND operations. Mathematically, the port-to-port BDD from port A to port B (denoted as BDD_AB) may be generated as follows:

$$BDD\_AB = f(BDD\_NE1, BDD\_NE2, \ldots, BDD\_NEn) = \bigwedge_{i=1}^{i=n} BDD\_NEi$$

where BDD_NE1 to BDD_NEn are the BDDs 124 representing the n NEs 115 in the logical path between ingress port A 116 and egress port B 118, and the symbol $\wedge$ denotes the logical AND operation.

The port-to-port model may be similarly generated for all logical paths from all possible ingress ports to all possible egress ports of the network device 112. Then the DM 122 for the network device 112 is generated by combining all port-to-port models using a logical OR operation. The DM 122 generated for the given network device 112 may then be communicated (or otherwise provided) to the LWVS 130 (and optionally stored locally on the network device 112), and used for verifying the reachability property of the network.

As described above, each network device 112 is responsible for building a respective DM 122 locally, based on the state and configuration of the local NEs (i.e., the NEs belonging to the respective network device 112). There is no need to transmit unprocessed (or raw) data about the network device 112 outside of the network device 112, which may be beneficial for better data security. The network device 112 may respond to requests from the LWVS 130 to generate the DM 122 in stable state, and/or to generate the DM 122 based on a non-committed configuration of an NE.

In contrast to some other conventional network verification techniques, which first tries to compute the current state of the network based on configuration information and then performs verification, the method described above makes use of information about both the current state of the network device 112 and the configuration of network device 112 to generate DMs 122. The disclosed method may enable better scalability and/or faster model generation compared to some existing techniques.

As described previously, the DMs 122 generated by the network devices 112 are communicated (or otherwise provided) to the LWVS 130 to perform network verification. Details about the operation of the LWVS 130 are now discussed.

Each DM 122 is a respective Boolean function (e.g., encoded as a respective BDD) representing how a corresponding network device 112 behaves with respect to a particular network property of interest. The LWVS 130 receives the DMs 122 from the network devices 112 in the NVD 110 and builds a logical topology in the logical domain 110, as discussed further below. Verification is then performed by inputting a header space into a source DM 122, calculating the output header space at a destination DM 122, and determining whether the desired verification property is satisfied. Some network properties that may be verified using the DMs 122 include reachability (e.g., whether there are any network devices 112 that cannot be reached by a packet), loop detection (e.g., whether any packets end up back at the source device 112), presence of black holes (e.g., whether there is any device 112 that drops packets), route detection (e.g., to map routes from a source device 112 to a destination device 112), and security breach (e.g., whether a firewall provided by a network device 112 is correctly operating), among others. The DMs 122 may be generated only for network devices 112 (and network entities within network devices 112) that are relevant to the network property of interest.

A header space is a technique to model packets communicated in the network. First, it should be understood that the processing of packets in a network is mostly concerned with information contained in the packet header rather than information contained in the payload. Each network device 112 processes a packet by processing header fields that are encoded as some sequence of binary values (i.e., a sequence of "1" or "0" header bits). Accordingly, for the purpose of verification, a packet can be modeled as a packet header that is a point in $[0, 1, *]^L$ space, where L is the length of the packet header, and * is a "wildcard" value that can be "1" or "0". The header space is thus the space of all possible packet headers of length L, and is used to represent a set of possible packets rather than a single packet.

As an input header space travels a logical path from the source DM 122 to the destination DM 122, each DM 122 encountered by the header space applies a respective Boolean function to the header space, which represents how the corresponding network device 112 processes the header space (e.g., send to which output port, if the network is being verified for a reachability property). Then the output header space can be used to verify whether the desired verification property is satisfied, using header space calculations (which is well-known and will not be described in detail here).

Figure 5:
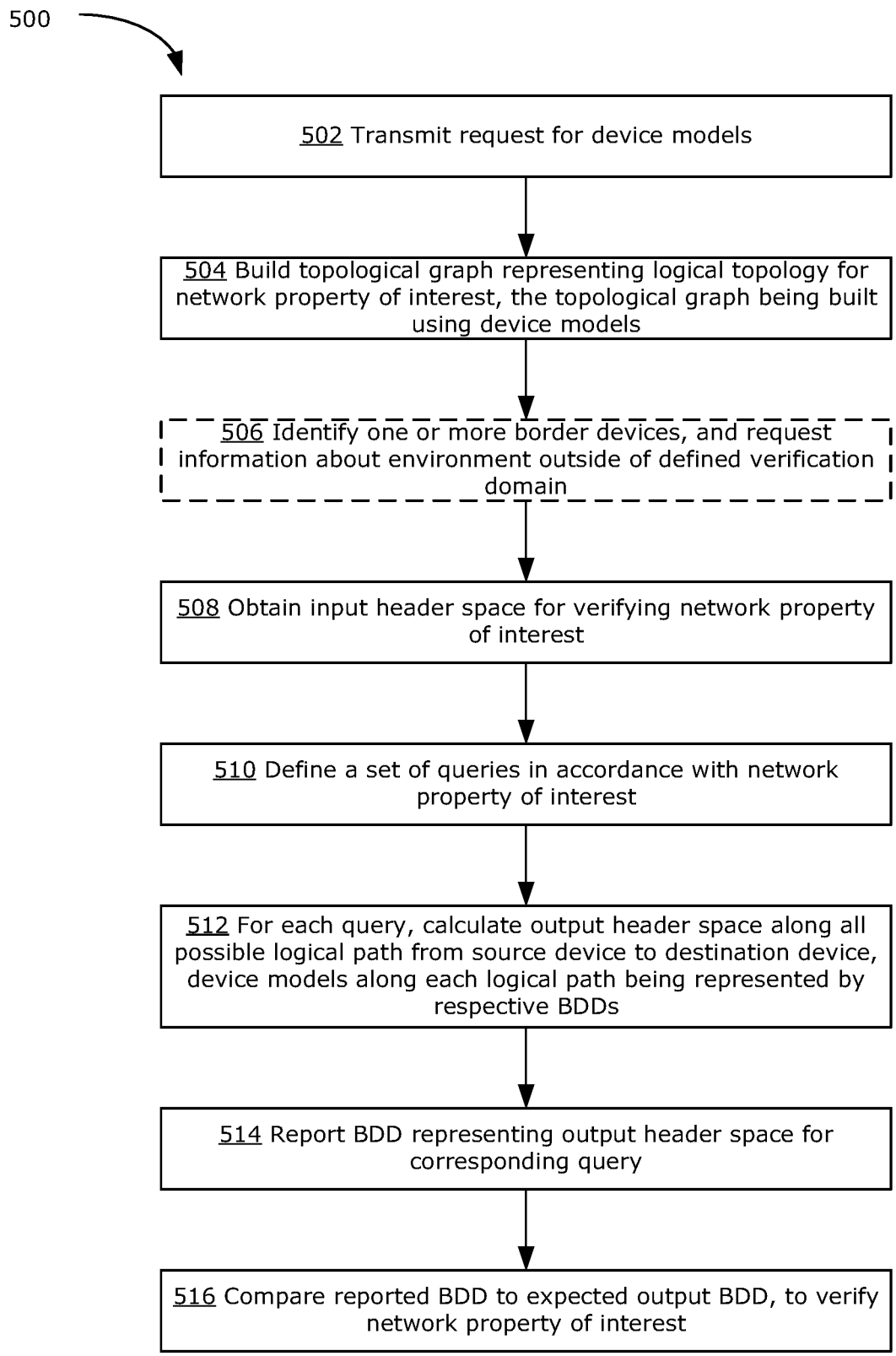
FIG. 5 is a flowchart illustrating an example method for network verification at a light weight verification service, in accordance with examples described herein.

FIG. 5 is a flowchart illustrating an example method 500 for network verification, which is performed by the LWVS 130. For example, the LWVS 130 may be implemented by a server using software, hardware, or a combination of software and hardware (e.g., implemented by the computing system 250, using the processor device 225 executing instructions 238).

When network verification is first initiated, the NVD 110 and one or more network properties of interest (i.e., the properties to be verified) may be defined by the LWVS 130. The network devices 112 in the NVD 110 may be already registered with the LWVS 130, or otherwise identified to the LWVS 130. For example, when a DV 114 is first initiated on a network device 112, the network device 112 may initiate a registration request to register the DV 114 with the LWVS 130. In another example, the LWVS 130 may discover DVs 114 residing on network devices 112 in the network, for example using a broadcast message. The definition of the NVD 110, definition of a network property of interest, and registration of the DVs 114 may take place prior to the method 500.

At 502, the LWVS 130 transmits a request to network devices 112 (e.g., to all network devices 112 with registered DVs 114), requesting transmission of respective DMs 122. In response to the request, each network device 112 transmits a respective DM 122, representing the respective network device 112, to the LWVS 130.

In some examples, step 502 may be performed outside of the method 500. For example, the LWVS 130 may request DMs 122 from network devices 112 at the time of registration, or at a regular interval (e.g., daily), rather than as part of a verification. Additionally, a network device 112 may unilaterally transmit its DM 122 to the LWVS 130 (e.g., if the DM 122 has been updated to reflect a recent state change or configuration change at the corresponding network device 112) without a request by the LWVS 130. The LWVS 130 may store the received DMs 122 (e.g., in the memory 228) and retrieve the DMs 122 from memory when needed to perform verification.

At 504, based on the received DMs 122, the LWVS 130 builds a topological graph in the logical domain 120, which represents the logical topology for the network property of interest (e.g., reachability). The LWVS 130 may make use of additional global information, such as adjacencies, to build the logical topology. Such global information may be provided (e.g., inputted) by an administrator of a network in which the NVD 110 resides, or a network controller having global oversight of the network in which the NVD 110 resides. In some examples (e.g., when executing an interior gateway protocol (IGP)) a network device 112 may be able to provide such global information. In the topological graph, each vertex (or node) in the graph represents a respective network device 112, and each edge in the graph represents a connection (e.g., a logical connection and/or a physical connection) between two network devices 112, according to the network property of interest. For example, depending on the network property of interest, the edges of the topological graph may represent BGP peering in the control plane, tunnel connections in an overlay network, or other possible logical and/or physical connections.

The logical topology may be built by the LWVS 130 dynamically, depending on the network property of interest, at the time that verification is to be performed. This may help to ensure that the verification is performed using models that correctly reflect the most recent state and configuration of each network device 112. This may be in contrast to some conventional verification techniques, which rely on a single network-level model generated at a single point in time.

Optionally, at 506, based on the defined NVD 110, LWVS 130 may identify one or more network devices 112 that are border devices (i.e., are on the border of the defined NVD 110, and interface with the environment outside of the NVD 110) and requests any required information about the outside environment from the identified border device(s). The requested information about the outside environment may include, for example, information about the configuration of outside entities (i.e., entities not belonging to the NVD 110) connected to the NVD 110 via the identified BDV(s), such as information about IP addresses or network domain (e.g., virtual local area network (VLAN) or virtual extensible local area network (VXLAN)) of the outside entities. The requested information may be used by the LWVS 130 to generate an input header space that corresponds to the configuration of outside entities. In some examples, the LWVS 130 may not require information about the outside environment, and may generate a broad input header space that encompasses all possible configurations that can interface with the identified BDV(s).

At 508, the LWVS 130 obtains an input header space for performing the verification for the network property of interest. The input header space may be considered to be a symbolic variable, representing the space of all possible packet headers that may be inputted to the NVD 110. In some examples, the input header space may be obtained from a network device 112 that has been identified as a border device at optional step 506. For example, the network device 112 may generate the input header space and communicate the input header space to the LWVS 130. For example, using information about the configuration (e.g., IP addresses) of outside entities, an input header space may be defined that represents the range of possible IP addresses of the outside entities connected to the NVD 110 via the identified border device.

In another example, the LWVS 130 may generate the input header space by detecting the configuration of the network device 112 where identified BDV is located. The input header space may be defined using information extracted from the configuration or state of the network device 112 (e.g., based on device configuration data such as whether there is a local attached LAN, static routes, etc.). For example, if a given network device 112 is (or includes) a border router that interfaces with other entities outside of the NVD 110, and the given network device 112 has an IP address of 192.168.10.10/24, then the LWVS 130 may define the input header space to be a symbolic variable representing the space of all possible packet headers that would be received at this IP address. In this particular example, the header space may be defined as (11000000, 10101000, 00001010, ******), which is the binary representation of 192.168.10.** (where * is a wildcard that can be any binary value). In some examples, the header space may be configured by an operator of the LWVS 130.

At 510, the LWVS 130 defines a set of one or more queries in accordance with the network property of interest that is to be verified. For example, if the network property of interest is reachability of all interfaces connecting the NVD 110 to entities outside of the NVD 110, then the LWVS 130 may first identify all border devices, then define queries in the form of header spaces based on a pair of DMs 122 representing a source border device and a destination border device. It should be understood that other such queries may be defined for verifying other network properties of interest. In general, there may be a source network device 112 (also referred to simply as source device) and a destination network device 112 (also referred to simply as destination device) for each query. Each query may be defined as a header space. Because the header space is multi-dimensional space where the value in each dimension is binary, the defined header space can be represented as a BDD. The BDD representing the query may be referred to as the input BDD. In this way, the LWVS 130 generates the input head space, representing the query, to be inputted to the DMs 122 in step 512.

At 512, for each input BDD representing a query, the LWVS 130 calculates an output header space (represented by an output BDD). The output BDD is calculated by applying, to the input BDD, the DM 122 of each network device 112 encountered along a logical path (according to the topological graph in the logical domain 120) from the source network device 112 to the destination network device 112. The LWVS 130 may use the topological graph to identify all possible logical paths from the source network device 112 to the destination network device 112, calculate the respective path-specific output header space resulting from traversal of each logical path, and calculate the final output header space as a union of the path-specific output header spaces.

For each logical path, the LWVS 130 calculates the path-specific header space by sequentially applying, to the input BDD, the DM 122 of each network device 112 along the path from the source network device 112 to the destination network device 112. Each DM 122 is a Boolean function, which is represented by a respective BDD (referred to as the DM BDD). The DM BDD models how the network device 112 of the corresponding network device 112 processes a received packet, for example by forwarding the packet via a particular output port, or by blocking the packet (also referred to as dropping the packet).

The LWVS 130 traverses the logical path one DM 122 at a time, updating the header space as each DM 122 is applied. For clarity, the result of applying a given DM 122 to the header space is referred to herein as the device-specific output header space (represented by a device-specific output BDD); the header space obtained by traversing a given logical path from the source network device 112 to the destination network device 112 is referred to herein as the path-specific output header space (represented by a path-specific output BDD); and the header space obtained by traversing all possible logical paths from the source network device 112 to the destination network device 112 is referred to herein as the final output header space (or simply the output header space) (represented by a final output BDD).

It should be noted that the input to a given DM 122 (also referred to as the device-specific input header space) is the device-specific output header space from a previous DM 122 along the logical path (except for the special case where the given DM 122 corresponds to the source network device 112, in which case the device-specific input header space is simply the input header space defined for the query). For a given DM 122, the LWVS 130 calculates the device-specific output header space (represented by a device-specific output BDD) by applying the given DM 122 to the device-specific input header space that was inputted at the given DM 122. Because both the DM 122 and the device-specific input header space are represented by BDDs, applying the DM 122 to the header space is equivalent to conjugating the device-specific input BDD with the DM BDD. That is, a logical AND operation is performed between the input BDD and the DM BDD, mathematically represented as follows:

$$\text{device-specific output BDD} = (\text{device-specific input BDD}) \wedge (\text{DM BDD})$$

where $\wedge$ represents the logical and operation.

In this way, each DM BDD along the logical path from the source network device 112 to the destination network device 112 is sequentially applied one at a time (though not necessarily without interruptions in the sequence). Because only one DM BDD is applied at a time, after the LWVS 130 has calculated the device-specific output BDD for a given DM BDD (e.g., using the above calculation), the memory resources of the LWVS 130 may be reused for the next DM BDD that is encountered in the logical path. In some examples, the LWVS 130 may be capable of processing multiple logical paths in parallel.

At 514, the final output header space outputted from the destination network device 112 (as defined by the query) is reported as a reachable header space for that query. The final output header space may be reported in the form of a final output BDD.

At 516, the reported output BDD is compared to an expected output BDD, to verify the network property of interest. In some instances, verification might indicate that the network is performing as expected, and in other instances, verification may reveal positive or negative deviations from expected network performance. For example, if the network property of interest is reachability, the expected output BDD may be the original input BDD defined at the start of the query. If the reported output BDD is reduced compared to the original input BDD, this may indicate that reachability is not satisfied for all packets and all network devices 112. It may be noted that, because the header space is computed using device-level BDDs (rather than a single network-level BDD, as in some conventional approaches), it is possible to identify a packet drop problem at a specific DM 122 (and hence a corresponding specific network device 112), if a reduced header space is reported. For example, using BDD operations, the device-specific output header space can be compared to the device-specific input header space at each DM 122 to identify if there has been any dropped header space at a particular DM 122.

Figure 6:
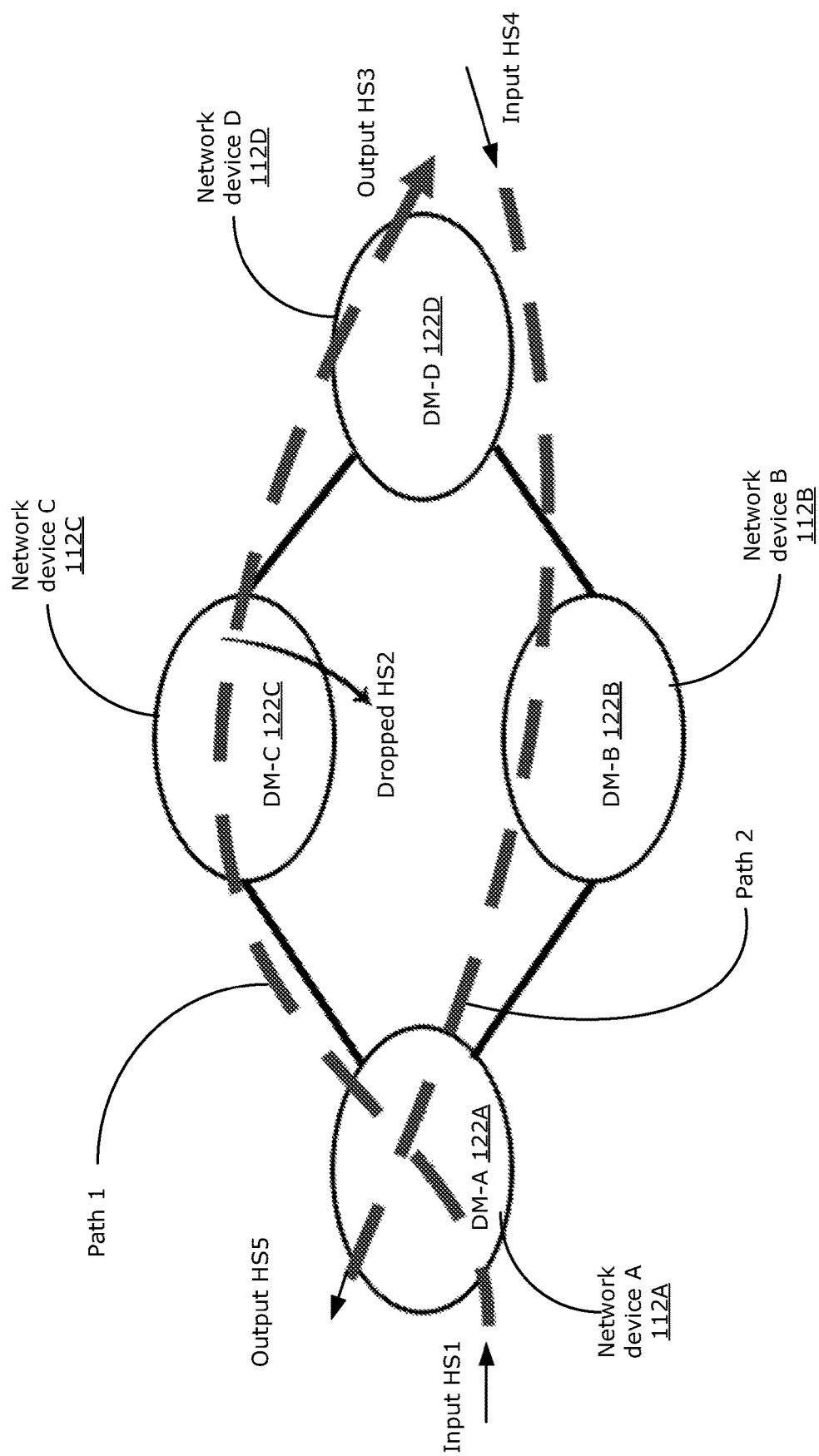
FIG. 6 illustrates an example implementation of the method of FIG. 5.

FIG. 6 shows an example implementation of the method 500, in a simplified logical topology. The logical topology includes four DMs 122, namely DM-A 122A, DM-B 122B, DM-C 122C and DM-D 122D (corresponding to network device A 112A, network device B 112B, network device C 112C and network device D 112D, respectively), each of which is encoded by a respective BDD. For the purpose of discussion, the network property being verified in FIG. 6 may be reachability, network device A 112A and network device D 112D may have been identified as border devices. One query may be defined with network device A 112A as the source device and network device D 112D as the destination device (accordingly, DM-A 122A is the source DM and DM-D 122D is the destination DM); and a second query may be defined with network device D 112D as the source device and network device A 112A as the destination device (accordingly, DM-D 122D is the source DM and DM-A 122A is the destination DM). Verification of other network properties of interest and using other queries may be performed in a manner similar to that described below.

As shown in the example topology graph of FIG. 6, the logical path (namely Path 1) from DM-A 122A to DM-D 122D may be different from the logical path (namely Path 2)

from DM-D 122D to DM-A 122A (e.g., DM-C 122C and DM-B 122B may represent one-way routing devices).

An input header space (denoted as HS1) represents the space of all packet headers that may be inputted to DM-A 122A. In some examples, HS1 may represent the range of IP addresses of outside entities connected to the NVD 110 via network device A 112A. In some examples, network device A 112A may define HS1 using information collected from the outside entities, and HS1 may be sent to the LWVS 130 by network device A 112A. Alternatively, HS1 may be defined by the LWVS 130 using information provided by network device A 112A about the outside entities. Similarly, another input header space (denoted as HS4) may represent the space of all packet headers that may be inputted to DM-D 122D.

The DMs along Path 1 are DM-A 122A, DM-C 122C and DM-D 122D, and an output header space (denoted as HS3) is calculated for Path 1 as follows:

$$HS3\ BDD = (HS1\ BDD) \wedge (DM\text{-}A\ BDD) \wedge (DM\text{-}C\ BDD) \wedge (DM\text{-}D\ BDD)$$

HS3 BDD thus represents the space of all headers that reaches DM-D 122D from DM-A 122A, when traveling along logical Path 1. In this example, there is also a dropped header space (denoted as HS2), representing all headers that are blocked (or dropped) by DM-C 122C.

The DMs along Path 2 are DM-D 122D, DM-B 122B and DM-A 122A, and another output header space (denoted as HS5) is calculated for Path 2 as follows:

$$HS5\ BDD = (HS4\ BDD) \wedge (DM\text{-}D\ BDD) \wedge (DM\text{-}B\ BDD) \wedge (DM\text{-}A\ BDD)$$

The output header spaces, represented by HS3 BDD and HS5 BDD in this example, are each reported separately as the result of the verification process.

The LWVS 130 compares the reported output header spaces against the expected outputs to verify the network property of interest (e.g., to check reachability, the output header space is expected to be the same as the input header space for each query; other network properties may be verified by performing other comparison procedures as appropriate). If the reported output header space is not expected, this may indicate there is a fault (e.g., unreachable device) in the network. In some examples, the query being performed may be assigned a reference number, the input header space for the query may be associated with the reference number assigned for the query, and each reported output header space may be associated with the reference number assigned for the query. In this way, each reported output header may be compared with the appropriate input header space, to identify any fault (e.g., any dropped header space).

In this example, there is no dropped header space along Path 2, and output HS5 is the same as input HS4 as expected. Accordingly, the LWVS 130 determines that there is no fault along Path 2. However, there is a dropped header space (namely HS2) along Path 1. This means that for HS2 the invariant of reachability is not upheld; however packets belonging to HS3 are able to reach the destination along Path 1. The LWVS 130 may identify the dropped header space (i.e., HS2 in this example) by comparing the output HS3 with input HS1. To identify the source of the fault, the LWVS 130 may pass the dropped header space through individual DMs 122 along Path 1, checking the device-specific output header space at each DM 122. In this example, when the dropped header space is passed through DM-C 122C, the resulting device-specific output from DM-C 122C is a reduced or empty header space, indicating that DM-C 122C is the source of the fault. By modeling network devices 112 as individual DMs 122, the verification process is thus able to identify the source of a fault with greater precision.

It should be understood that the verification process disclosed herein has some fundamental differences in how the header space is encoded, compared to the existing HSA approach. In HSA, the packet headers are encoded as subsets of geometric space. In contrast, in the disclosed verification process, packet headers are modeled as BDDs. HSA suffers from the state space explosion issue in the case of a large number of required bits of header space. In contrast, the disclosed verification process uses BDD, which is a more compressed structure for representing the header space and avoids the state space explosion problem. Moreover, HSA is typically limited to application in the data-plane. However, the disclosed verification approach may be utilized for both data-plane and control plane applications. This is because the LWVS 130 can generate different logical topologies in the logical domain 120 based on the type verifications. For example, for a single physical network in the NVD 110, there may be several different logical topologies (e.g., one topology representing logical connections in the data-plane, and another topology representing logical connections in the control plane) which may be selectively used for the symbolic simulation.

In the above-described partially distributed network verification method, each network device 112 is responsible for determining its own transfer function and generating its own DM 122. There is no need for a centralized entity to collect raw data about states or configurations at network devices 112. This may reduce or eliminate the need for a time-consuming process of data collection. Information about states and configurations of network devices 112 are first encoded as BDDs before being transmitted to the LWVS 130. Thus, raw data about device configurations and states are not exposed directly to possible outside detection, which may reduce or eliminate the risk of data theft, thus improving the security of the verification process.

Because generation of DMs 122 is performed in a distributed manner, DM generation can take place in a parallel manner, and in an asynchronous manner. This may help to reduce the time required for DM generation, may help to reduce the burden on computation resources at a centralized entity, and may help to ensure that each DM 122 is updated as soon as or shortly after a state or configuration change takes place at the network device 112. The distributed manner of DM generation also helps to improve scalability, in that generation of DMs 122 for a large network having a large number of network devices 112 is not limited by the computing resources at a centralized entity.

The disclosed network verification method also enables generation of different logical topologies dynamically, for verification of different aspects of the NVD 110. For example, different logical topologies may be defined depending on the specific routing protocol (e.g., BGP), network layer (e.g., layer 2 topology), and so forth. The LWVS 130 may also define the NVD 110 depending on the desired verification. In this way, the LWVS 130 is able to verify a specific part of the network or an individual mechanism of interest.

The modeling approach described above may be used to verify any aspect or mechanism in of the physical network. Notably, in the approach described above, each network device is modeled as a respective BDD, and the network is verified by traversing the device-level BDDs one by one, instead of using a single network-level BDD for verification. This approach may help to mitigate that state explosion problem.

Further, after traversing a device-level BDD in the logical topology, the memory resources used for storing the device-level BDD can be reused for the next device-level BDD along the logical path. Accordingly, the maximum size of BDD that needs to be processed at any time (and hence the amount of computing and memory resources required for that processing step) corresponds to the most complex network device (e.g., having the most NEs) in the network. The complexity of the BDD is capped at the device level, and does not increase with increased network size. This enables greater scalability because increasing the network size will not result in a BDD that exceeds computing or memory resources to process.

Because the verification is performed by traversing the network on a device level, rather than as a single network level BDD, more specific information about the source of a network fault may be determined. For example, if there is a packet drop problem in the network (e.g., as indicated by a reduced header space being reported as the output header space when verification is performed), the specific network device at which the packet drop problem is occurring can be identified.

In some examples, the partially distributed network verification method described above may be modified to be fully distributed, by distributing the functions of the LWVS 130 to the network devices 112.

In the disclosed examples for fully distributed network verification, there is no centralized entity (such as the LWVS described above). All operations in the verification process, including generating DMs and calculating output header spaces using DMs, are performed by network devices 112 (e.g., implementing respective DVs 114).

Figure 7:
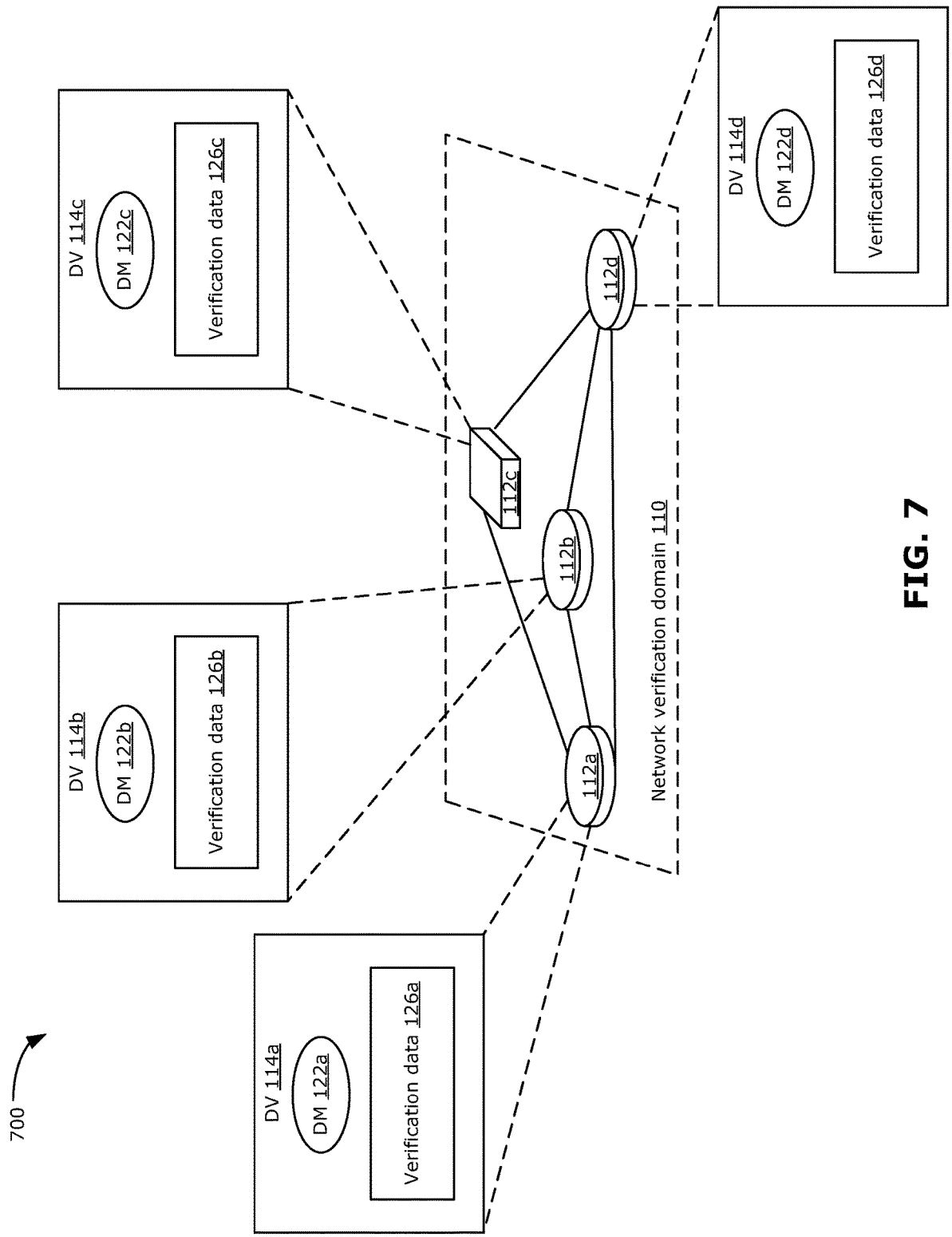
FIG. 7 illustrates an example verification architecture that may be used to implement a fully distributed network verification, in accordance with some examples of the present disclosure.

FIG. 7 shows a simple example of a fully distributed verification architecture 700 that may be used to implement examples described herein. The disclosed verification architecture 700 includes the NVD 110 and network devices 112, similar to the example architecture 100 of FIG. 1. In FIG. 7, the DMs 122 and verification data 126 are shows as residing on the DVs 114. It should be understood that this is intended to illustrate that each DV 114 manages the respective local DM 122 and local verification data 126. However, it should be understood that the illustration in FIG. 7 does not necessarily reflect physical implementation (e.g., the local DM 122 and the local verification data 126 may be stored in the local memory of the network device 112, rather than within the DV 114). Network devices 112 at the border of the defined NVD 110 (also referred to as border devices) are the access points for traffic to the NVD 110. In some examples, a network controller or an administrator may define the NVD 110, and may configure the network devices 112 to identify whether a given network device 112 is a border device. In other examples, network devices 112 may use a peering protocol (e.g., Link Layer Discovery Protocol (LLDP) or BGP) to identify immediate neighbors and define the topology of the NVD 110 in a distributed manner. An input header space, representing the space of all possible traffic relevant to the network property of interest, may be symbolically inputted to the NVD 110 at border devices.

In the fully distributed verification architecture 700, there is no centralized entity. Instead, each network device 112, in addition to generating and maintaining a respective local DM 122, maintains a respective local set of verification data 126a, 126b, 126c, 126d (generally referred to as local verification data 126). The local verification data 126 may be used by the network device 112 to track its own device-specific input header space(s) and device-specific output header space(s). For example, the local verification data 126 may be maintained by a network device 112 as a table, where each entry (i.e., row) of the table includes: an identification of the ingress port at which a device-specific input header space is received; an identification of the egress port at which a device-specific output header space is transmitted; the received device-specific input header space; the transmitted device-specific output header space; and an identification of the logical path traversed by the device-specific input header space. An identifier for a logical path may be created by concatenating the identifiers of the DVs 114 corresponding to the network devices 112 encountered in the logical path (any other suitable technique for encoding the logical path may be used), for example. The identifier of the logical path traversed by the device-specific input header space may be included with the reported output header space, for example. In some examples, the logical path may be similarly tracked and reported in the partially distributed network verification approach (i.e., as described with reference to FIG. 1).

For example, a table entry maintained by a given network device 112 may be as follows:

| Ingress port | Egress port | Input HS | Output HS | Path |
|---|---|---|---|---|
| 1 | 2 | HS4 | HS5 | DVa, DVc |

The example above indicates that the device-specific input header space is HS4, which was received at ingress port 1. HS4 had previously traversed DVa (corresponding to network device 112a) followed by DVc (corresponding to network device 112c). The result of applying the local DM 122 is the device-specific output header space HS5, which is transmitted from egress port 2.

In fully distributed network verification, each network device 112 generates its own local DM 122 to represent the behavior of the respective network device 112. DM generation may be performed by the network device 112 using operations similar to the partially distributed network verification approach but omitting any communication with a centralized entity, for example using steps 304-312 described above.

Figure 8:
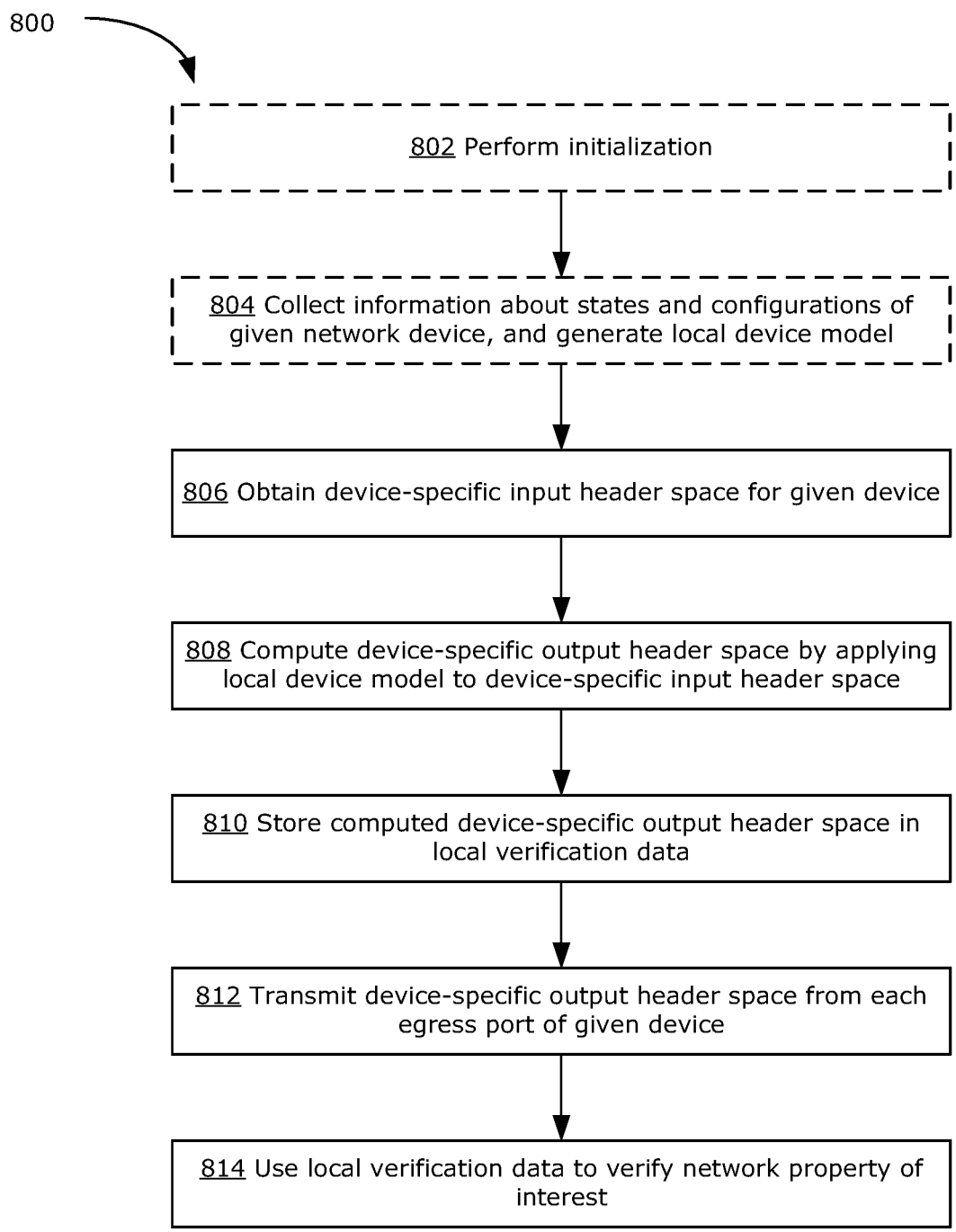
FIG. 8 is a flowchart illustrating an example method for network verification at a network device, in accordance with examples described herein.

FIG. 8 is a flowchart illustrating an example method 800 for network verification, which may be performed by a given network device 112 implementing a DV 114 (e.g., implemented by the computing system 220, using the processor device 225 executing instructions 238). For example, steps of the method 800 may be encoded as operations to be performed by the DV 114 residing on the given network device 112. The method 800 may be performed at preconfigured time intervals (e.g., based on a verification clock that is synchronized across all DVs 114). The method 800 may also be performed in response to a trigger, such as when a local DM 122 at a network device 112 has been updated (e.g., in response to a change to the state or configuration of the network device 112). The steps of the method 800 are now discussed in the context of a given network device 112.

Optional step 802 may be performed when network verification is first initiated. At optional step 802, the given network device 112 may initialize itself. Initialization at the given network device 112 may include establishing peer-to-peer connections with immediately neighboring network device(s) 112 (i.e., the network device(s) 112 that is(are) in direct logical and/or physical connection with the given network device 112). A peer-to-peer connection (also referred to as a peering connection or a peering link) may be stabled via a direct physical link or a logical link (e.g., using Internet Protocol Security (IPSec), Generic Routing Encapsulation (GRE) or Virtual Extensible Local Area Network (VXLAN) tunnels). Any suitable mechanism, such as Open Settlement Protocol (OSP) or BGP, may be used to establish peer-to-peer connections. Similarly, any suitable protocol (including Transmission Control Protocol (TCP), OSP or BGP) may be used for event monitoring and data exchange between network devices 112 during verification. Any suitable topology finding protocol, such as LLDP, may be used to discover neighboring network device(s) 112 and establish peer-to-peer connections. Alternatively, the topology may be preconfigured (e.g., as in BGP).

Initialization may also include each network device 112 synchronizing a verification clock with its neighboring network device(s) 112 for data collection. This may include synchronizing the data collection frequency and/or time interval (e.g., depending on the desired verification strategy), which may help to ensure that the verification reflects the state and configuration of all the network devices 112 at the same (or approximately the same) moment in time. To ensure that a consistent state of the NVD 110 is being verified, the same variable definitions with the same order for the header space should be used by all network devices 112 (e.g., the variable definitions and order for the header space may be configured for all network devices 112 by an administrator or network controller). The verification process should continue only after the NVD 110 is in a stable or converged state.

Optionally, if the given network device 112 is being initialized or an update to the local DM 122 is required (e.g., if the state or configuration of the network device 112 has been changed), at step 804 the given network device 112 may collect data and generate the local DM 122 (for example using steps 304-312 described above). The generated local DM 122, which may be encoded into BDD format or binary tree (or trie) format, is stored locally by the given network device 112.

In some examples, the initialization of the given network device 112 and generating the local DM 122 may take place prior to the method 800 instead of being part of the method 800.

At 806, the device-specific input header space is obtained by the given network device 112. For example, an administrator or network controller may configure the given network device 112 as a border device, and may define a query (including defining the given network device 112 as the source device, and another network device 112 as the destination device) to generate the input header space for the given network device 112 (e.g., using configuration information about the outside environment). For example, information about configuration of a connected outside LAN or configuration of static outside routing may be collected by the given network device 112.

If the given network device 112 is not a border device, the device-specific input header space is obtained by receiving, from a neighboring network device 112, the device-specific input header space at an ingress port of the given network device 112.

At 808, the given network device 112 computes the device-specific output header space by applying its local DM 122 to the device-specific input header space. The device-specific output header space that is computed may be referred to as the reachable header space, in the case where the network property being verified is reachability.

At 810, the computed device-specific output header space is stored in the local verification data of the given network device 112 (e.g., in the local memory 228 of the network device 112). The network device 112 stores a record in the local verification data 126, indicating the ingress port where the device-specific input header space was received, the device-specific input header space, the logical path traversed by the device-specific input header space (before reaching the given network device 112), the computed device-specific output header, and the egress port where the device-specific output header space was transmitted. The stored record may enable the network device 112 to compute whether there is any fault (e.g., dropped header space) locally, and may enable the network device 112 to retrieve the result of a previous query (e.g., in response to a request from an administrator or network controller, or if the same query is repeated).

At 812, the computed device-specific output header space is transmitted from each egress port of the network device 112. The device-specific output header space is transmitted to each neighboring network device 112 with which the network device 112 has a peer-to-peer connection. The network device 112 may also add the identifier of its own DV 114 to the identification of the logical path, and transmit the logical path identifier together with the device-specific output header space. For example, the network device 112 may concatenate the identifier of its own identifier DV 114 to the end of the logical path identifier. If the computed device-specific output header space is empty, a message with zero space is transmitted to the neighboring network device(s) 112. A neighboring network device 112 that receives a zero space as the input header space may simply relay the zero space to its respective neighboring network device(s) 112.

In addition to transmitting the device-specific output header space, the given network device 112 also transmits the original device-specific input header space that was obtained at step 806, and the logical path traversed by the original device-specific input header space. Thus, the given network device 112 also acts as a relay in that the input header space received at the ingress port is also passed on to the neighboring network device(s) 112 at each egress port. Relaying the original input head space to the neighboring network device(s) 112 in this way enables the final destination device to obtain the initial input header space that was initiated at the source device, thus enabling the final destination device to provide an end-to-end report for the query.

In some cases, if the given network device 112 is implementing a master DV, step 812 is not performed. A network device 112 implementing a master DV receives header spaces from all neighboring network device(s) 112 but does not transmit any header spaces. The role of the master DV may be configured by an administrator or a network controller, for example. A network device 112 implementing a master DV performs all the operations of a regular (i.e., non-master) DV, as described above. The network device 112 that is assigned the role of the master DV also performs the functions of a reporting server. For example, when a query is completed at a destination device (and the address of the network device 112 that is the master DV is configured at the destination device), the destination device reports the end-to-end result of the query to the master DV (the destination device may also store a copy of the result locally). The network device 112 that is the master DV may then store the result of the query, without applying its own DM. In this way, the results of all queries may be stored at a single device. The administrator or network controller may then obtain the results of all queries from the master DV, rather than requesting the results from each individual destination device (since different queries may have different destination devices).

At 814, the network device 112 uses the stored local verification data to verify the network property of interest. For example, the network device 112 may determine whether there is any fault (e.g., dropped header space) locally.

Figure 9:
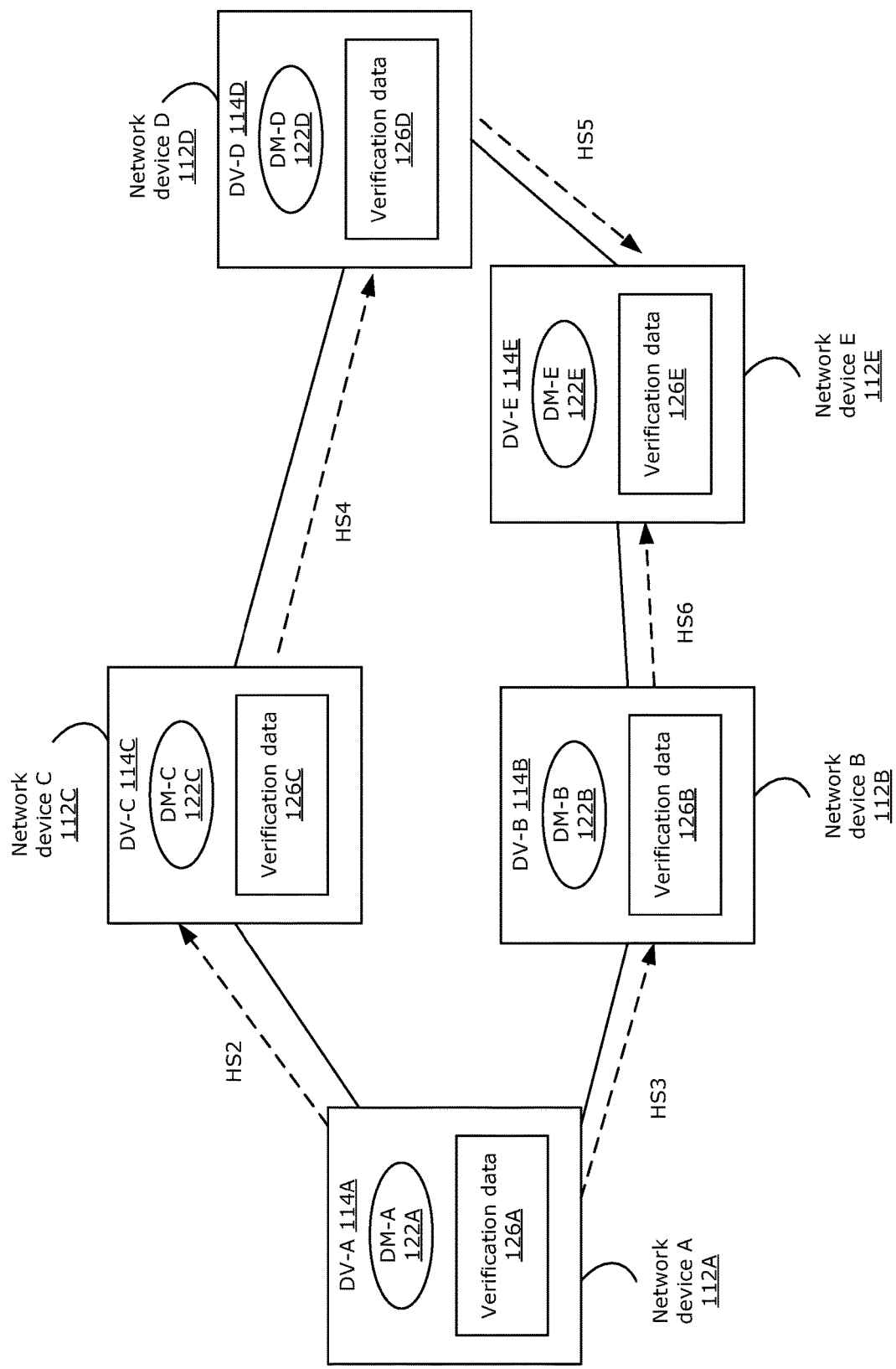
FIG. 9 illustrates an example implementation of the method of FIG. 8.

FIG. 9 shows an example implementation of the method 800, in a simplified logical topology. The logical topology reflects the connections between five network devices 112 (namely network device A 112A, network device B 112B, network device C 112C, network device D 112D and network device E 112E) implementing respective DVs 114, namely DV-A 114A, DV-B 114B, DV-C 114C, DV-D 114D and DV-E 114E (each managing DM-A 122A, DM-B 122B, DM-C 122C, DM-D 122D and DM-E 122E, respectively). A respective local set of verification data 126 resides in each respective network device 112. Each DM 122 may be represented by a respective BDD. Solid lines connecting the network devices 112 indicate physical and/or logical connections between the respective network devices 112, and dashed arrows indicate the path traversed by the header space. For the purpose of discussion, the network property being verified in FIG. 9 may be reachability. Verification of other network properties of interest and using other queries may be performed in a manner similar to that described below. In this example, network device A 112A and network device D 112D may have been identified as border devices.

FIG. 9 illustrates an example where the verification is performed starting from an input header space defined by network device A 112A and inputted to DM-A 122-A. The input header space defined by network device A 112A may be denoted as HS1, and considered to be received via ingress port 1 (e.g., ingress port 1 is the interface with entities outside of the NVD 110). In this example, network device A 112A has two neighbors (namely network device C 112C and network device B 112B) reachable via respective egress ports 2 and 3. Network device A 112A computes the device-specific output header space from the ingress port to each egress port, and transmits the computed device-specific output header space to each neighboring network device 112 via the respective port. The device-specific output header space denoted as HS2 is transmitted to network device C 112C via egress port 2, and the device-specific output header space denoted as HS3 is transmitted to network device B 112B via egress port 3. Network device A 112A also transmits the path identifier and the original HS1 to each neighboring network device 112. The local verification data 126A at network device A 112A may store the following entries:

| Ingress port | Egress port | Input HS | Output HS | Path |
|---|---|---|---|---|
| 1 | 2 | HS1 | HS2 | NULL |
| 1 | 3 | HS1 | HS3 | NULL | where a "NULL" value for the path indicates that network device A 112A is itself the start of the logical path in the logical topology.

In a similar manner, the header space is propagated to other network devices 112 in the logical topology. For example, network device B 112B applies its local DM-B 122B to compute the output header space denoted as HS6, and transmits HS6 to network device E 112E together with the path identifier (with the identifier of DV-B added to the path) and the received HS1 and HS3. The local verification data 126B at network device B 112B may store the following:

| Ingress port | Egress port | Input HS | Output HS | Path |
|---|---|---|---|---|
| 1 | 2 | HS3 | HS6 | DV-A |

Network device C 112C applies its local DM-C 122C to compute the output header space denoted as HS4, and transmits HS4 to network device D 112D together with the path identifier (with the identifier of DV-C added to the path) and the received HS1 and HS2. The local verification data 126C at network device C 112C may store the following:

| Ingress port | Egress port | Input HS | Output HS | Path |
|---|---|---|---|---|
| 1 | 2 | HS2 | HS4 | DV-A |

HS4 is received at network device D 112D. Network device D 112D applies its local DM-D 122D to compute the output header space denoted as HS5, and transmits HS5 to network device E 112E together with the path identifier (with the identifier of DV-D added to the path) and the received HS1, HS2 and HS4. The local verification data 126D at network device D 112D may store the following:

| Ingress port | Egress port | Input HS | Output HS | Path |
|---|---|---|---|---|
| 1 | 2 | HS4 | HS5 | DV-A, DV-C |

Network device E 112E in this example has been assigned the role of master DV. Accordingly, network device E 112E does not propagate the header space to any other network device 112. The header spaces received by network device E 112E and their associated paths may be stored in the local verification data 126E as follows:

| Ingress port | Egress port | Input HS | Output HS | Path |
|---|---|---|---|---|
| 1 | NULL | HS6 | NULL | DV-A, DV-B |
| 2 | NULL | HS5 | NULL | DV-A, DV-C, DV-D |

Network device E 112E also receives the header spaces relayed by neighboring network devices 112, and may store this information in the local verification data 126E also. For example, network device E 112E may store the end-to-end result for a query (e.g., storing the initial input header space at the source device for the query, and the final output header space at the destination device) in a table as described above.

In a fully distributed network verification approach, there is no centralized entity that oversees the operation of all network devices 112. Instead, each network device 112 is responsible for managing its own operations. For example, each network device 112 may implement its respective DV 114 using a finite state machine (FSM).

Figure 10:
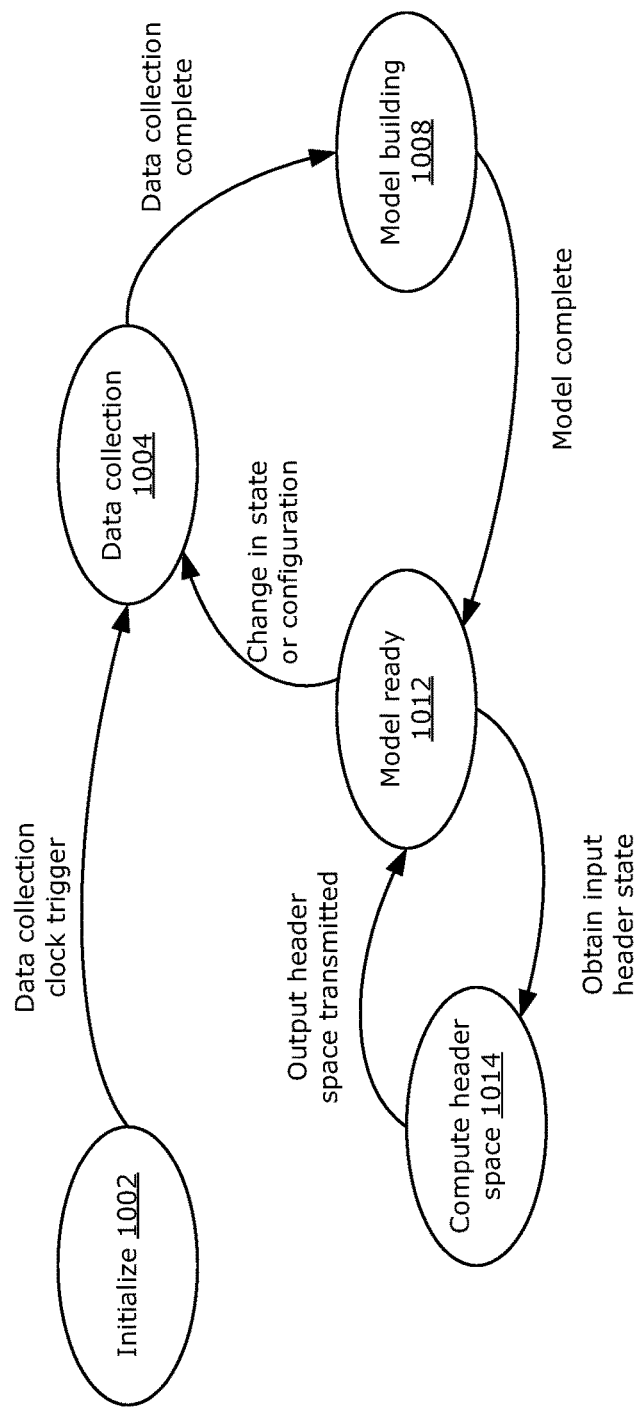
FIG. 10 illustrates an example finite state machine that may be used to implement fully distributed network verification by a network device, in accordance with examples described herein.

FIG. 10 shows an example state diagram illustrating example states and transitions of the FSM for implementing a DV 114 by a network device 112. It should be understood that this is only illustrative and is not intended to be limiting.

The DV 114 starts in an initialize state 1002. When the DV 114 is in the initialize state 1002, initialization operations are performed, such as discovering peer-to-peer neighboring device(s), establishing peer-to-peer connection(s) with neighboring device(s), and synchronizing clocking with neighboring device(s). After initialization has been completed, the synchronized clock triggers a transition to the data collection started state 1004. In the data collection started state 1004, information is collected about the state and configuration of the network device 112 (and logical entities within the network device 112), detects any updates to local data. If the network device 112 is a border device, information is also collected about the outside environment. After data collection is complete, the DV 114 transitions to the model building state 1008, during which the collected data is used to determine the Boolean function representing the behavior of the network device 112, and to encode the Boolean function in the local DM 122 (e.g., as a BDD). After the local DM 122 has been completed, the DV 114 stores the local DM 122 in the local memory. After the local DM 122 has been stored, the DV 114 transitions to the model ready state 1012. In the model ready state 1012, the network device 112 is now ready to participate in fully distributed network verification.

When the DV 114 is in the model ready state 1012, a change in the state or configuration of the network device 112 causes the DV 114 to transition back to the data collection state 1004, in order to collect data about the changed state or configuration and to update the local DM 122 to reflect the changed state or configuration.

From the model ready state 1012, the DV 114 transitions to the compute header space state 1014 when a device-specific input header state is obtained. For example, if the network device 112 is a border device, the device-specific input header state may be obtained by an administrator or network controller defining the device-specific input header state for the network device 112 using information collected from the outside environment. If the network device 112 is a non-border device, the device-specific input header state may be obtained by the network device 112 receiving the device-specific input header state from a neighboring device. In the compute header space state 1014, the network device 112 computes its device-specific output header space (e.g., as described above). After the device-specific output header space has been computed, the network device 112 updates the local verification data to store the computed device-specific output header space (e.g., as described above).

After the local verification data has been updated with the computed device-specific output header space, the network device 112 transmits the computed device-specific output header space from each egress port. After the device-specific output header space has been transmitted, the DV 114 transitions back to the model ready state 1012. It should be noted that the transmission of the device-specific output header space may be omitted if the network device 112 is the destination device and has the role of the master DV, and instead the master DV transitions directly to the model ready state 1012.

In the fully distributed network verification examples disclosed herein, verification can be performed in parallel by different network devices 112, as header spaces are propagated throughout the network. Accordingly, the model states and the required resources for performing verification may be distributed across network devices 112, which may help to mitigate the problem of state explosion and enable better scalability.

In some examples, the network device 112 may generate a hierarchy-based DM 122, which includes models representing the behavior of individual network entities within the corresponding network device 122. An example of network verification using hierarchy-based models is described in U.S. patent application Ser. No. 17/080,112, entitled "METHODS AND SYSTEMS FOR NETWORK VERIFICATION USING HIERARCHY-BASED MODEL", the entirety of which is hereby incorporated by reference. It should be understood that the partially and fully distributed network verification techniques disclosed herein are equally applicable using hierarchy-based models.

It may also be noted that, in some examples, instead of preparing logical models for representing whole devices (e.g., using collected state and configuration data), more detailed models can be derived using collected statistics of prior failures and/or the scope of known changes in the network using various techniques known in the art (see, for example, Steffen et al. "Probabilistic verification of network configurations", SIGCOMM '20). This may enable logical models to be generated to focus on only certain aspects of interest (e.g., to focus on only functions that are known to be prone to failure and/or that are known to have changed), instead of generating fully detailed models for all devices and entities. Such an approach may reduce the resources (e.g., required memory and/or required computing time) needed for model generation.

In various examples, the present disclosure has described partially distributed network verification methods and systems (e.g., using a centralized light weight entity) and fully distributed network verification methods and systems (i.e., without any centralized entity). Both partially and fully distributed network verification may be considered to be distributed network verification.

In the disclosed distributed network verification methods and systems, at least the operations for data collection and model generation are distributed across individual network devices instead of being performed by a centralized entity. The distributed approach may provide advantages over existing centralized network verification techniques. For example, the disclosed distributed network verification methods and systems may enable better scalability and may mitigate the state explosion problem. The disclosed distributed network verification methods and systems may also enable better data security.

In some examples, the disclosed distributed network verification methods and systems may enable network verification to be performed in a more efficient manner (e.g., requiring less computing time), because at least some verification operations may be performed in parallel. Further, because the device model is locally generated by each network device, changes in state and/or configuration of a given network device may be reflected in an updated device model generated locally by the given network device. The need to re-generate a model for the entire network may be avoided. In the fully distributed examples, the given network device may be responsible for computing the updated device-specific output header space and transmitting to its neighbors.

The disclosed distributed network verification methods and systems may enable verification of a portion (or a slice) of the network, or verification of a specific network mechanism, without having to verify the entire network.

The use of a light weight centralized entity (in the partially distributed network verification examples), or the omission of any centralized entity (in the fully distributed network verification examples) may be more cost effective, compared to existing centralized network verification solutions, because the overhead associated with the centralized entity may be reduced or avoided.

The disclosed examples may be relatively easy to implement in existing computing systems. The disclosed distributed network verification methods and systems may make use of some existing protocols for peer-to-peer communications, as discussed previously. In some examples, data collection may be performed using existing tools, such as command line queries.

The present disclosure has described an approach to network verification in which a network may be verified by dynamically traversing logical models (e.g., represented by BDDs) representing network devices one-by-one, instead of traversing one aggregated model representing the entire network. Such an approach may help to mitigate the state explosion problem of model checking. After each device-level BDD has been traversed, the verification service may reset the BDD reuse the memory resources for processing the next device-level BDD. Further, the largest BDD that need to be processed is capped at the device level, rather than increasing with increased network size. Thus, the disclosed approach enables better scalability compared to conventional verification approaches.

The present disclosure may be applicable to verification of any types of networks, including both wired and wireless networks, as well as any individual mechanisms in the networking domain.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, at a computing system, for verification of a network having a plurality of network devices, the method comprising:
   obtaining, from each network device in the network, a respective device-level binary decision diagram (BDD) representing logical behavior of the respective network device for a network property of interest, each device-level BDD being an independent BDD computed by the respective network device;
   generating an input BDD to query for the network property of interest, the input BDD representing an input header space, the input header space representing possible packet headers received at a source device, the source device being in a logical topology representing connections among the network devices;
   generating an output BDD representing an output header space, the output header space representing possible packet headers obtained at a destination device in the logical topology as a result of the input header space traversing possible logical paths from the source device to the destination device, wherein the output BDD is generated by logically applying, to the input BDD, a sequence of independent device-level BDDs, each device-level BDD in the sequence of independent device-level BDDs being applied one at a time, each device-level BDD in the sequence of independent device-level BDDs representing a respective network device in one of the possible logical paths from the source device to the destination device;
   reporting the output BDD;
   comparing the reported output BDD to an expected output BDD to verify the network property of interest;
   detecting, from comparison of the reported output BDD with the expected output BDD, a fault in the network;
   determining a dropped BDD by computing a difference between the expected output BDD and the reported output BDD, the dropped BDD representing a dropped header space;
   providing the dropped BDD as input to each individual device-level BDD and determining whether output from each individual device-level BDD is a reduced or empty header space compared to the dropped header space represented by the dropped BDD; and
   identifying, as a source of the fault in the network, a faulty device represented by a particular individual device-level BDD that is determined to have outputted a reduced or empty header space.

2. The method of claim 1, further comprising:
   transmitting, to each of the plurality of network devices, a request for the respective device-level BDDs; and
   obtaining the respective device-level BDDs in respective responses from the respective network devices.

3. The method of claim 1, further comprising:
   defining the logical topology in accordance with the network property of interest-using a topology graph, the device-level BDDs being respective vertices in the topological graph.

4. The method of claim 1, further comprising:
   obtaining at least one device-level BDD from a transmission from a respective one of the plurality of network devices, the transmission being received in absence of a request for the device-level BDD.

5. The method of claim 1, further comprising:
  identifying at least one border device from the plurality of network devices, the at least one border device providing an interface between the network and one or more entities outside of the network; and
  obtaining, from the at least one border device, information about the one or more entities outside of the network.

6. The method of claim 5, further comprising generating the input BDD from the information about the one or more entities outside of the network.

7. A system for verification of a network, the system comprising:
  a processor device configured to cause the system to:
    obtain, from each of a plurality of network devices in the network, a respective device- level binary decision diagram (BDD) representing logical behavior of the respective network device for a network property of interest, each device-level BDD being an independent BDD computed by the respective network device;
    generate an input BDD to query for the network property of interest, the input BDD representing an input header space, the input header space representing possible packet headers received at a source device t, the source device being in a logical topology representing connections among the network devices;
    generate an output BDD representing an output header space, the output header space representing possible packet headers obtained at a destination device in the logical topology as a result of the input header space traversing possible logical paths from the source device to the destination device, wherein the output BDD is generated by logically applying, to the input BDD, a sequence of independent device-level BDDs, each device-level BDD in the sequence of independent device-level BDDs being applied one at a time, each device-level BDD in the sequence of independent device-level BDDs representing a respective network device in one of the possible logical paths from the source device to the destination device;
    report the output BDD;
    compare the reported output BDD to an expected output BDD to verify the network property of interest;
    detect, from comparison of the reported output BDD with the expected output BDD, a fault in the network;
    determine a dropped BDD by computing a difference between the expected output BDD and the reported output BDD, the dropped BDD representing a dropped header space;
    provide the dropped BDD as input to each individual device-level BDD and determining whether output from each individual device-level BDD is a reduced or empty header space compared to the dropped header space represented by the dropped BDD; and
    identify, as a source of the fault in the network, a faulty device represented by a particular individual device-level BDD that is determined to have outputted a reduced or empty header space.

8. The system of claim 7, wherein the processor device is further configured to cause the system to:
  transmit, to each of the plurality of network devices, a request for the respective device- level BDDs; and
  obtain the respective device-level BDDs in respective responses from the respective network devices.

9. The system of claim 7, wherein the processor device is further configured to cause the system to:
  define the logical topology in accordance with the network property of interest using a topology graph, the device-level BDDs being respective vertices in the topological graph.

10. The system of claim 7, wherein the processor device is further configured to cause the system to:
  obtain at least one device-level BDD from a transmission from one of the plurality of network devices, the transmission being received in absence of a request for the device-level BDD.

11. The system of claim 7, wherein the processor device is further configured to cause the system to:
  identify at least one border device from the plurality of network devices, the at least one border device providing an interface between the network and one or more entities outside of the network; and
  obtain, from the at least one border device, information about the one or more entities outside of the network.

12. The system of claim 11, wherein the processor device is further configured to generate the input BDD using information about the one or more entities outside of the network.

13. A non-transitory computer-readable medium having instructions stored thereon that when executed by a processor device of a system, cause the system to:
  obtain, from each of a plurality of network devices in a network, a respective device-level binary decision diagram (BDD) representing logical behavior of the respective network device for a network property of interest, each device-level BDD being an independent BDD computed by the respective network device;
  generate an input BDD to query for the network property of interest, the input BDD representing an input header space, the input header space representing possible packet headers received at a source device, the source device being in a logical topology representing connections among the network devices;
  generate an output BDD representing an output header space, the output header space representing possible packet headers obtained at a destination device in the logical topology as a result of the input header space traversing possible logical paths from the source device to the destination device, wherein the output BDD is generated by logically applying, to the input BDD, a sequence of independent device-level BDDs, each device-level BDD in the sequence of independent device-level BDDs being applied one at a time, each device-level BDD in the sequence of independent device-level BDDs representing a respective network device in one of the possible logical paths from the source device to the destination device;
  report the output BDD;
  compare the reported output BDD to an expected output BDD to verify the network property of interest;
  detect, from comparison of the reported output BDD with the expected output BDD, a fault in the network;
  determine a dropped BDD by computing a difference between the expected output BDD and the reported output BDD, the dropped BDD representing a dropped header space;
  provide the dropped BDD as input to each individual device-level BDD and determining whether output from each individual device-level BDD is a reduced or empty header space compared to the dropped header space represented by the dropped BDD; and identify, as a source of the fault in the network, a faulty device represented by a particular individual device-level BDD that is determined to have outputted a reduced or empty header space.

14. The non-transitory computer-readable medium of claim 13, wherein the instructions, when executed, further cause the system to:

transmit, to each of the plurality of network devices, a request for the respective device-level BDDs; and obtain the respective device-level BDDs in respective responses from the respective network devices.

15. The non-transitory computer-readable medium of claim 13, wherein the instructions, when executed, further cause the system to:

define the logical topology in accordance with the network property of interest using a topology graph, the device-level BDDs being respective vertices in the topological graph.

16. The non-transitory computer-readable medium of claim 13, wherein the instructions, when executed, further cause the system to:

obtain at least one device-level BDD from a transmission from a respective one of the plurality of network devices, the transmission being received in absence of a request for the device-level BDD.

17. The non-transitory computer-readable medium of claim 13, wherein the instructions, when executed, further cause the system to:

identify at least one border device in the plurality of network devices, the border device providing an interface between the network and one or more entities outside of the network; and obtain, from the at least one border device, information about the one or more entities outside of the network.

18. The non-transitory computer-readable medium of claim 17, wherein the processor device is further configured to generate the input BDD using information about the one or more entities outside of the network.

* * * * *